(12) United States Patent
Safars et al.

(10) Patent No.: US 7,574,649 B1
(45) Date of Patent: Aug. 11, 2009

(54) BOOK METAPHOR FOR MODIFYING AND ENFORCING SEQUENTIAL NAVIGATION OF DOCUMENTS

(75) Inventors: Michel Safars, Gif sur Yvette (FR); Fabrice Frachon, Gif sur Yvette (FR); Pierre Silvestre De Sacy Nougaret Durafort, Paris (FR); Thierry Verrecchia, Cergy (FR); Philippe Lelong, Paris (FR)

(73) Assignee: Keeboo SARL, Zac Villejust (FR)

( * ) Notice: Subject to any disclaimer, the term of this patent is extended or adjusted under 35 U.S.C. 154(b) by 0 days.

(21) Appl. No.: 09/132,327

(22) Filed: Aug. 11, 1998

Related U.S. Application Data

(60) Provisional application No. 60/055,608, filed on Aug. 14, 1997.

(30) Foreign Application Priority Data

May 6, 1998 (WO) ...................... PCT/FR98/00917

(51) Int. Cl.
*G06F 15/00* (2006.01)
(52) U.S. Cl. ........................ 715/200; 715/273; 715/277
(58) Field of Classification Search ................ 707/526, 707/501, 513, 530; 345/775, 776; 717/111, 717/115–117; 715/501.1, 513, 526, 530, 715/775–776, 200, 205, 234–274, 277, 255–256
See application file for complete search history.

(56) References Cited

U.S. PATENT DOCUMENTS

| | | | | |
|---|---|---|---|---|
| 5,237,651 A | * | 8/1993 | Randall | 345/350 |
| 5,341,293 A | * | 8/1994 | Vertelney et al. | 707/530 |
| 5,524,201 A | * | 6/1996 | Shwarts et al. | 715/763 |
| 5,596,700 A | * | 1/1997 | Darnell et al. | 345/340 |
| 5,632,022 A | * | 5/1997 | Warren et al. | 345/350 |
| 5,696,982 A | * | 12/1997 | Tanigawa et al. | 707/528 |
| 5,742,816 A | * | 4/1998 | Barr et al. | 707/104 |
| 5,745,895 A | * | 4/1998 | Bingham et al. | 707/10 |
| 5,754,939 A | * | 5/1998 | Herz et al. | 455/3.04 |
| 5,768,580 A | * | 6/1998 | Wical | 707/102 |
| 5,867,811 A | * | 2/1999 | O'Donoghue | 704/1 |
| 5,898,434 A | * | 4/1999 | Small et al. | 345/810 |

(Continued)

FOREIGN PATENT DOCUMENTS

EP     0 472 070     2/1992

(Continued)

OTHER PUBLICATIONS

Shneiderman, Designing user interface :strategies for eff. human-comp. inter., p. 72-74, 1992*

(Continued)

*Primary Examiner*—Cesar B Paula
(74) *Attorney, Agent, or Firm*—Osha • Liang LLP

(57) ABSTRACT

A method for organizing and consulting electronic data in a media library, the electronic data originating from a plurality of sources and being supplied in various forms. The method provides a universal link between these various forms of electronic data in such a way that the electronic data can be consulted, stored and reused on common media within the media library. The method is particularly adaptable for off-line consultation of documents collected on the Web or from any document resource.

18 Claims, 10 Drawing Sheets

U.S. PATENT DOCUMENTS

| | | | | |
|---|---|---|---|---|
| 5,909,690 | A | * | 6/1999 | Tanigawa et al. ............ 707/526 |
| 6,029,182 | A | * | 2/2000 | Nehab et al. ................ 715/205 |
| 6,034,680 | A | * | 3/2000 | Kessenich et al. ........... 345/329 |
| 6,076,166 | A | * | 6/2000 | Moshfeghi et al. ............. 726/4 |
| 6,081,829 | A | * | 6/2000 | Sidana ....................... 709/203 |
| 6,128,635 | A | * | 10/2000 | Ikeno ........................ 715/532 |
| 6,148,335 | A | * | 11/2000 | Haggard et al. ............. 709/224 |
| 6,154,757 | A | * | 11/2000 | Krause et al. ............... 715/530 |
| 6,192,165 | B1 | * | 2/2001 | Irons ......................... 382/306 |
| 6,233,620 | B1 | * | 5/2001 | Gish .......................... 709/203 |
| 6,237,006 | B1 | * | 5/2001 | Weinberg et al. ........... 345/419 |
| 6,473,752 | B1 | * | 10/2002 | Fleming, III .................. 707/4 |
| 6,486,895 | B1 | * | 11/2002 | Robertson et al. ........... 345/776 |
| 6,625,803 | B1 | * | 9/2003 | Massena et al. ............. 717/100 |
| 7,509,270 | B1 | * | 3/2009 | Hendricks et al. ............ 705/26 |

FOREIGN PATENT DOCUMENTS

| WO | WO 92/08199 | 5/1992 |
|---|---|---|

OTHER PUBLICATIONS

WordPerfect 6.1 screendumps, Fig. 1-2, Apr. 1996.*

Taylor, T.C, E-mail moves closer to universal links, abstract, Jan. 1991.*

Wordperfect 6.1 thesaurus, and mail screendumps, Apr. 15, 1996.*

Lemay et al "Laura Lemay's Web Workshop JavaScript", Sams.net (1996), p. 65-69.*

Lemay et al "Laura Lemay's Web Workshop Microsoft FrontPage 97", Sams.net, Jan. 17, 1997, pp. 341-364, 539-569).*

'Client/Server End-To-End Response Time:. Real Life Experience', Mark Maccabee, IBM Thomas J. Watson Research Center Yorktown Heights, NY, 1996.*

E. H. Rogers, "NoteMaker: A Hyper-Design Notebook to Support Informal Communication in the Engineering Design Process", pp. 141-144, IPCC91 Proceedings The Engineered Communication, vol. 1, Sessions 1-11, Oct. 30, 1991.

"Searching for Annotation in Documents on a Computer", p. 816, Research Disclosure, No. 318, Oct. 1, 1990.

S.K. Card et al., "The WebBook and the Web Forager: An Information Workspace for the World-Wide Web", pp. 111-117, CHI '96 Conference, Apr. 13, 1996.

T. Katsuyama et al., "Multimeda "Paper" Services/Human Interfaces and Multimedia Communication Workstation for Broadband ISDN Environments", pp. 220-228, IEICE Transac-tions on Communication, vol. E76-B, No. 3, Mar. 1, 1993.

"BeOS Makes a Splash", p. 9, PC Magazine, vol. 16, No. 5, Mar. 4, 1997.

* cited by examiner

BOOK METAPHOR FOR MODIFYING AND ENFORCING SEQUENTIAL NAVIGATION OF DOCUMENTS

BACKGROUND OF THE INVENTION

The present invention relates to a method for organizing and consulting electronic data in the environment of a media library.

The proliferation and the development of information media (Mail, Web, NewsGroup, etc.), of communications networks such as Internet or of companies' document databases have led to a considerable increase in the amounts of data, documents and information in general. The users of these new technologies (computer specialists or otherwise) are confronted with problems of consulting, storing, organizing, working on, annotating, sharing and transmitting this mass of information.

The storage and the management of documents collected from every type of medium, such as a network, very often constitute a real problem. There exist various approaches for optimization of the storage, which make reference to the example of a book.

Mention may be made particularly of the work by Xerox PARC, Bell Labs (smart paper), Interval Research (Paul Allen and Rob Tow), MIT Media Lab, and Modern Age Books, Inc. The products resulting from this work have the common feature of proposing a metaphor of a book and tools allowing navigation within electronic books.

The product "SuperBook Document Browser" is already known, and provides an interactive environment for analysis of data and graphical representations. This product offers a table of contents, an indexing system, annotations and hypertext functions.

The products "WebBook" and "WebForager", designed by Xerox Palo Alto Research Center, are also known. The WebBook is a three-dimensional interactive book consisting of HTML pages. The Web Forager is an application which inserts the WebBook and other objects into a hierarchical three-dimensional work space. The WebBook takes advantage of the metaphor of a book, and assembles a group of Web pages. The WebBook pre-loads a set of web pages and displays them in the form of a simulated physical book. Links can be coded with the aid of different colors, to distinguish, for example, links between pages and links to references external to the book. When a book is closed, a page marker is automatically placed on the last page consulted. The books can be provided with page markers and be arranged on a shelf. When a book is taken down from its shelf, it is reopened directly at the last page consulted. This product makes it possible to produce "Topic WebBooks", "Hot List Books" or "Search Reports".

The WebBook concept takes advantage of the metaphor of a book in the series of prior works such as those produced by Brown or Card and Henderson. Mention may also be made on this subject of the document WO 92 08199 which discloses a method of implementing a metaphor of a book in which all the documents stored are incorporated within a single document. Mention may also be made of the TabWorks system developed by Xerox.

However, the user of these products, taking advantage of the metaphor of a book, is still confronted with the problem of efficient and easy storage of the documents gathered together into the various books of his library. Every time a new book is created, the question is posed of a choice of structure for this book, and a simple organization into chapters and sub-chapters does not make it possible to cope with the complexity of the problems of storage posed, problems which, moreover, differ depending on the origin and on the nature of the documents collected.

There also exists, for document management systems (DMS), a document management integration standard called ODMA (Open Document Management API) allowing applications and document management systems to operate with each other via a single high-level API interface independently of every platform and of every language.

The ODMA standard specifies a set of interfaces which the applications may use to perform operations of a DMS document management system. Moreover, mention may be made of the database management standards of the ODBC (Open Database Connectivity) type or JDBC (Java Database Connectivity) type. Mention may be made, moreover, of the downloadable software of the "plug-in" type which also constitutes interfaces for document access which are independent of every platform.

However, none of these products or standards makes it possible to cope with the specific problem of the storage and of the management of documents in the specific context of the metaphor of a book.

SUMMARY OF THE INVENTION

The object of the present invention is to remedy these drawbacks by offering a method for organizing and consulting electronic data in the environment of a media library, which allows a quick and simple realization of books from sets of documents collected from various information sources.

This is obtained with a method for organizing and consulting electronic data in the environment of a media library, these electronic data originating from a plurality of sources and supplied in various forms.

According to the invention, this method is configured to provide a function of universal link between these various forms of electronic data in such a way that said electronic data can be consulted, stored and reused on common media within the media library.

The method according to the invention thus makes it possible to provide the users with a "universal link" to all the technologies existing in this field. This link has the special feature of being able to adapt to all the forms of documents or of elements which have to be consulted, stored, organized, worked on, annotated, shared, transmitted, or any combination of the foregoing functions. This link also possesses the capability of providing a solution to the problem of the reuse of the information and of the knowledge acquired. By taking advantage of the method described in the remainder of the document, the user adds value to the information represented by his work tool in a way never before achieved. The following values may be taken as a reference, by way of indication, for measuring the value of an item of information in its various states:

| | |
|---|---|
| There is a document somewhere | Value = 0 |
| The document has been found | Value = 1 |
| The document can be recovered | Value = 10 |
| The document is associated with others | Value = 100 |
| The document is annotated | Value = 1000 |
| This knowledge can be shared | Value = 10000 |

Preferably, this method is configured to provide, for each type of work to be carried out on electronic data consulted as a document, a visual display mode which is suitable for this work.

In particular, the organizing and consulting method according to the invention can include a mechanism for consultation of an electronic data source, this mechanism being based on the metaphor of a book.

In an embodiment of the method according to the invention, it further comprises incremental generation of books and of persistent data from electronic data originating from "Push"-type mechanisms.

Furthermore, the organizing and consulting method according to the invention can be advantageously configured to provide a sheet or a loose-leaf divider making it possible to keep information on the screen during the consultation of other information accessed from hypertext links or by any other mechanism.

BRIEF DESCRIPTION OF THE DRAWINGS

Other features and advantages of the invention will emerge further in the description below. On the attached drawings, given by way of non-limiting examples.

DESCRIPTION OF THE PREFERRED EMBODIMENTS

In the following description, the book and the documents are used as reference elements. They could be disks or any other element containing some information. It should be added that any type of reproduction of the information does not in any way detract from the innovative nature of the present invention. In particular, representations of the elements described in what follows in three-dimensional space could be envisaged. The following method could equally well be applied on personal computers, portable and pocket computers, personal organizers, WebTVs, etc. It could also be envisaged in the form of a graphics "shell" or even as a working desk for modern operating systems.

An exemplary implementation of the organizing and consulting method according to the invention will now be described, presenting the organization and the presentation of the information first of all.

Figure 4:
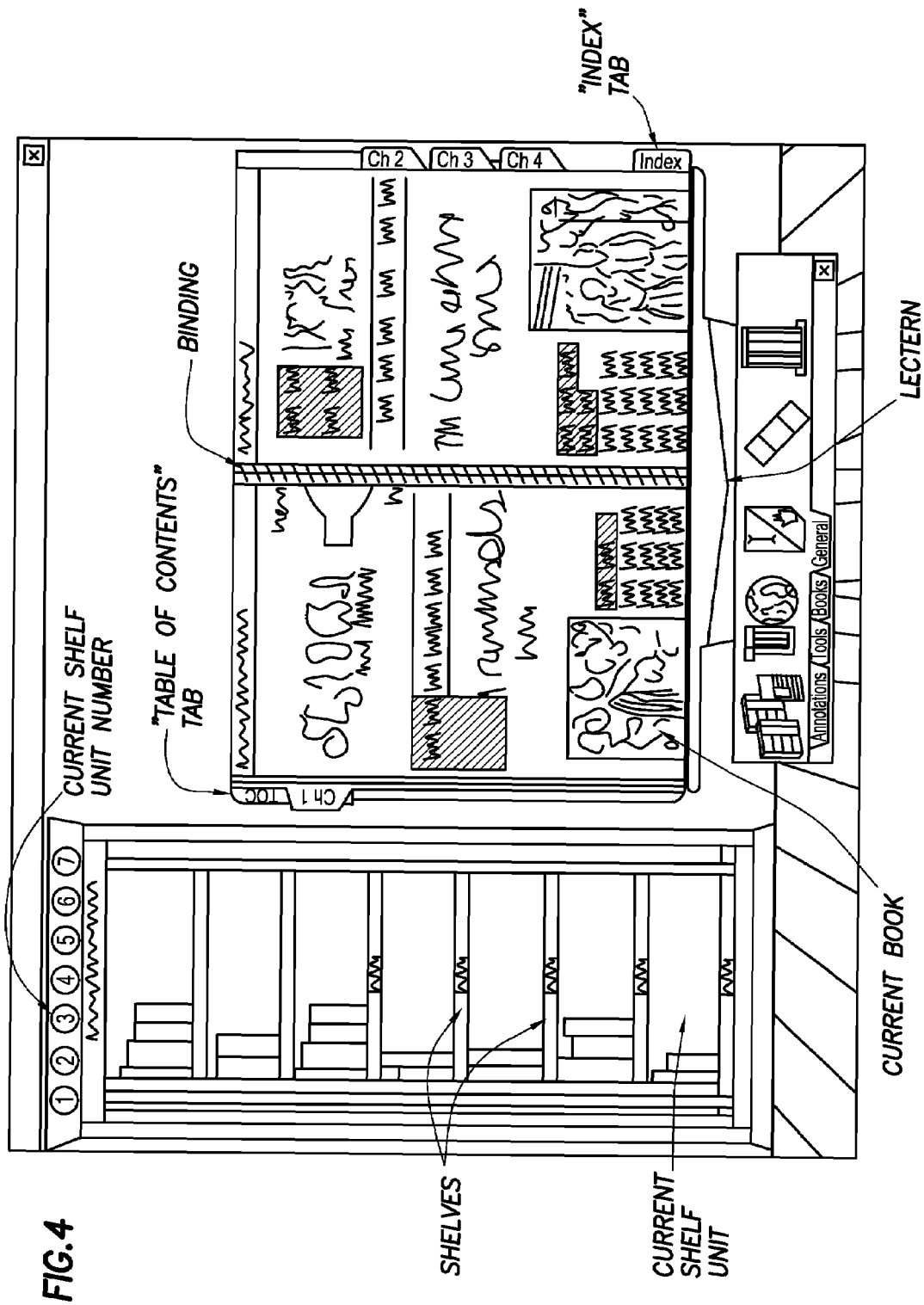
FIG. 4 is a screen copy obtained with the method according to the invention, illustrating a visual display in library mode.
Figure 5:
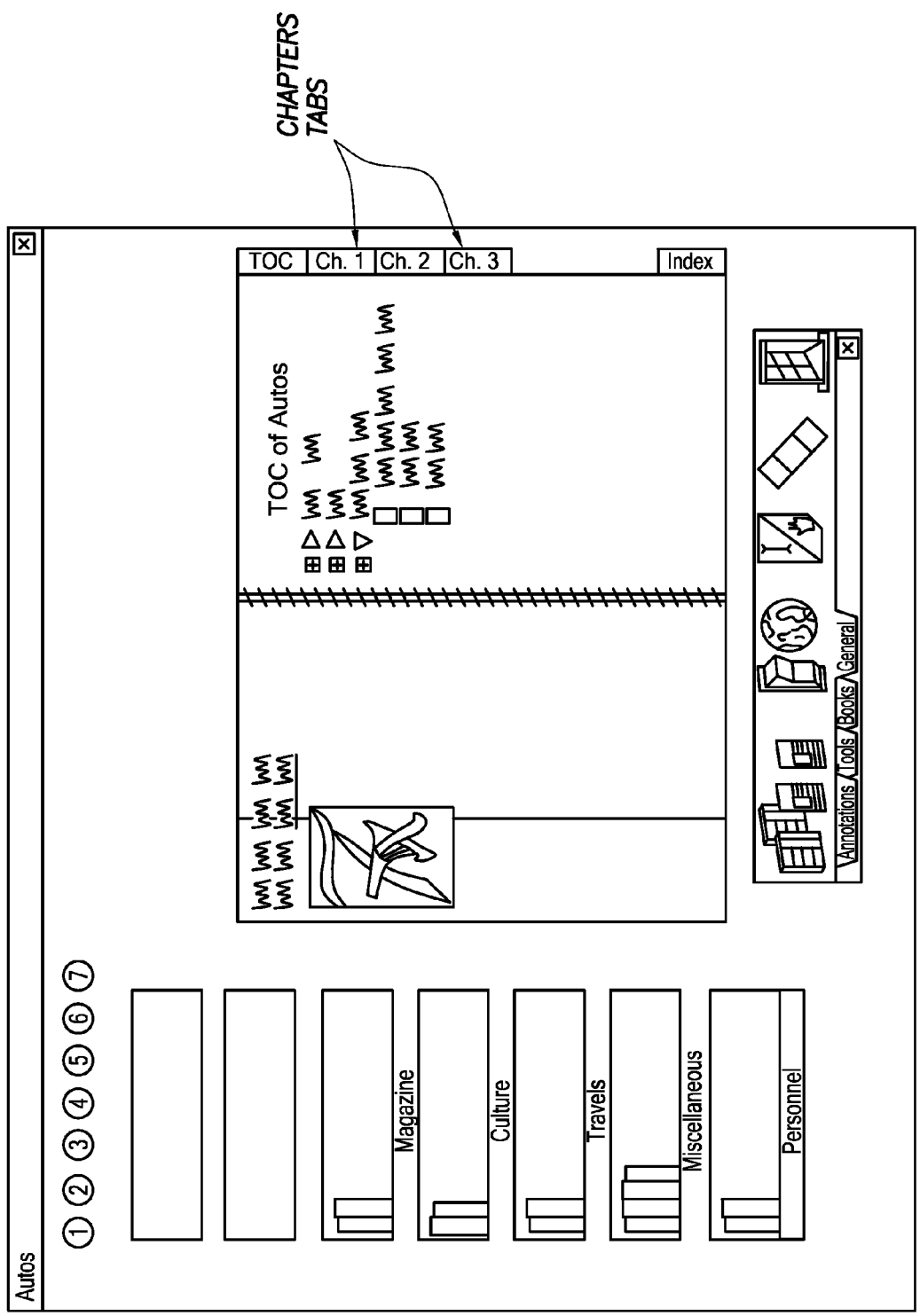
FIG. 5A is a screen copy obtained with the method according to the invention, illustrating a visual display in lectern (or book-stand) mode, in a first example of reproduction.

The organizing and consulting method according to the invention makes it possible to hold information in a library of 7 shelf units, as FIG. 4 illustrates. Each shelf unit has a title displayed at the top of the unit; it is sufficient to click on the title in order to alter it directly. In lectern mode, illustrated by FIG. 5, a single shelf unit is present on the screen at any one time. The adjacent shelf units can be discerned on each side; it is necessary only to click on the units in order to move from one shelf unit to another. A color is associated with each shelf unit.

Each shelf unit includes 7 shelves. Each shelf has a title displayed on its edge; it is necessary only to click on the title to edit it directly. Each shelf can contain several books, 14 for example. An administrative shelf exists, separate from the shelf units reserved for the user. One of the two compartments of this administrative shelf can temporarily accommodate the workbooks (7 at most if the user places an eighth book in it, the organizing and consulting method according to the invention automatically replaces the most recently used workbook in the library). The other compartment of the administrative shelf brings together the administrative books of the organizing and consulting method according to the invention, to which we will return. This administrative shelf is integrated within the tools palette in order to allow instantaneous access to it in all the visual display modes, with reference, for example, to the floating palette.

The user may use bookends (graphics objects) in order to group a few books together onto the same shelf.

The edge of the book is a visual representation chosen when it is created (and alterable subsequently). Its title is displayed in a help bubble when the mouse passes above the book alternatively, the title may be displayed directly on this notical edge. The first cover page includes the title of the book, and any illustration supplied by the author. Titles and illustrations can be altered by a single click on the titles or a double click on the illustration. The second cover page includes the identification of the author (with his electronic address and possibly a photo) and an optional short text as a summary or presentation of the book. The third and the fourth cover pages are never displayed.

The first page of the book is its table of contents; this possesses a tab. All the pages of the book are referenced in it, and are grouped together by the author into chapters and sub-chapters. The pagination of this table of contents is conventional (indentation, trailing dotted lines, etc.). Only the chapters of level possess a tab, and are displayed when the book is first opened. The reader may display or mask the detailed contents of a chapter or of a sub-chapter by clicking on an icon symbolizing a chapter. When he comes back to a book which has already been consulted, he finds the table of contents in the state in which he left it. If the book can be altered, the reader can reorganize the table of contents by dragging and dropping, and he can create a new chapter or sub-chapter. The pages including annotations are identified visually in the table of contents.

Figure 9:
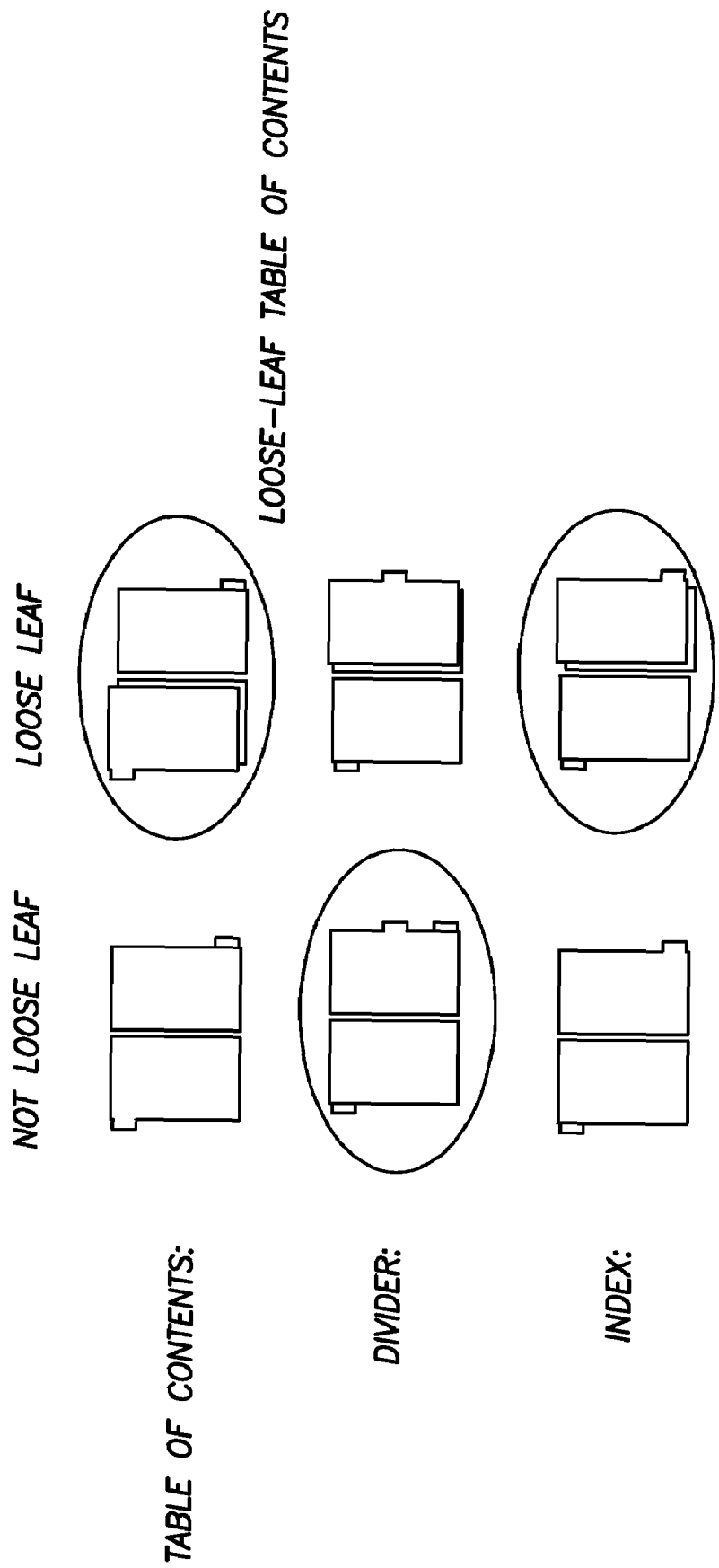
FIG. 9 illustrates the concept of loose leaves employed in the method according to the invention.

From the table of contents, the user can pass directly to any page of the book by double-clicking on its reference (the book opens at the corresponding page and the table of contents disappears). In order to navigate through the book from the table of contents, the reader has the option of converting the page of the table of contents into a "loose leaf" separator, by reference to FIG. 9, placed above the left-hand page of the book. To close it again, so that he can put it back in its place, he has only to click on an icon provided for this purpose. This icon is located on the table of contents page.

The last page of the book is its index; this possesses a tab (the way in which it functions is described later).

The contents and the organization of a book can be altered if the user is the author thereof, or if the author has sent him this book and indicated explicitly that it could be altered by the addressee.

When the user chooses a book, the book always opens at the page at which it was open when the user closed it for the last time. A function of accelerated skimming makes it possible quickly to leaf through a book and to stop when the page sought is identified. The central spiral of the book is a "lift" proportional to the number of pages of the book; this makes it possible to move directly to a given page. When the user places the cursor of the mouse on this spiral, a help bubble dynamically displays the number of the page corresponding to the position of the cursor over the height of the spiral. It may also, depending on the user's preferences, display an preview of the book at the corresponding page, allowing rapid identification of the page of interest. This central spiral can be dragged: the width of one of the two pages can be reduced in favor of the other so as to enhance the legibility of the latter.

A book may bring together an unlimited number of pages containing documents of different types.

Each page of a book represents a complete document. A page may contain and display any conventional office document, or an HTML page of a Web site, or any other document originating from one of the sources managed by the organizing and consulting method according to the invention. If the book can be altered, the user may ask to alter the document displayed on a page if the application corresponding to the type of the document is available on the workstation. This application is then run by the software implementing the organizing and consulting method according to the invention on this document in order to allow it to be altered. The application is run separately; the alteration does not take place in the software implementing the organizing and consulting method according to the invention, which is not an editing tool but an organization tool. However, we do not exclude the possibility of editing documents directly from the tool. When the user returns to the method of management according to the invention, the software reloads the document so as to give effect to any changes.

Regardless of which document is contained on a page, and even if the book cannot be altered, the user may always associate different types of annotations with a page:

Self-adhesive notes, by sticking a rectangle, which can be re-sized and moved around, anywhere on the page and in which the user can type free text. The self-adhesive note may extend past the top of the page; in this case it becomes a bookmark on which a short text can be placed (the body of the bookmark, that is to say the part of the self-adhesive note which is not visible once the book is closed, can still be re-sized freely and may contain a longer text). By clicking on the bookmark, the user opens the book directly at the corresponding page. The self-adhesive notes also have the characteristic of being opaque: they allow the document onto which they are stuck to show through.

Multimedia self-adhesive notes allow sound, images, URLs, etc. to be inserted.

Hypertext notes allow a "jump" to other pages of the same or of another book.

Keywords (a maximum of 7), input in a free field appearing at the bottom of each page, or in a specialized self-adhesive note called "keyword note". These keywords describe the content of the page (topics, contacts, current files, etc.). The software implementing the organizing and consulting method according to the invention keeps, in its catalogue, the list of all the keywords appearing in the library. A few simple functions for help with inputting may also be proposed: graphical visual display of the recognition of an existing keyword, keywords all used up, access to the complete list of existing keywords. A function allows all the occurrences of a given keyword to be deleted from a book.

Bookmarks can be placed at the top of a page, and make it possible to identify pages individually. A few notes can be placed in these bookmarks. The notes page is a special case of an annotation. This is a page which can be inserted anywhere in a book, making it possible to input plain text (no particular formatting). Its graphical representation clearly distinguishes it from the "normal" pages referencing a document. The notes page is also a special case of the insertion of a new page described below.

Stickers taking the form of small icons (colored geometric shapes or figurative icons) capable of being stuck anywhere a book employed in the organizing and consulting method according to the invention, and capable of being the subject of a search. The list of stickers is managed in the catalogue, in the same way as the list of keywords. The user can easily import the stickers of his choice (by specifying a graphics file). Rubber stamps are a special case of a sticker; they are transparent ("urgent", "confidential", etc.).

The highlighter makes it possible to select different places in a document according to color. The highlighter in the margin allows a vertical highlighting streak of variable height which can be stuck into the margin of a document.

The organizing and consulting method according to the invention records the author and the time stamp of each annotation. The user always has the option of masking, temporarily, the annotations of the book which he is in the process of consulting.

The various elements deleted by the user (books, pages, annotations, etc.) are placed in a dustbin. The dustbin thus keeps a certain number of documents (defined in a preference), which it is possible to recover at any time. It is also possible to empty the dustbin at any time.

As far as the insertion of documents is concerned, the pages are created implicitly as and when documents are added into the book. Four different approaches exist for finding then designating a document to be added into a book:

For using a document already located (drag & drop), this document is already present on the user's desk, and the user drags it onto a book. If the book is open, the document is inserted after the active page, and then becomes the active page.

For identification by location (navigation), the user moves outside his library to the document sought, by navigating in the native organizational structure of the documents: in the case of files, this is the tree structure of the folders accessible on the workstation; in the case of HTML documents, is the World Wide Web; in the case of documents shared within a company, it may mean documentation databases for electronic mail, or it may mean folders for storing the electronic mail.

To gain access to this functionality, the user has to open the Navigation Book (SurfBook) held on the administrative shelf. The table of contents on the first page of the navigation book includes a chapter for each source of documents which is recognized by the organizing and consulting method according to the invention: Web, Files, document databases, electronic mail, etc. Each of these chapters is, naturally, associated with a divider.

In order to allow better integration of the system into the existing one, provision is made for the insertion of a function of "Sending the current document in BooXeven" within the existing navigators. The page will then be inserted at the end of the SurfBook. This will allow the users to keep their usual navigator while taking advantage of the power of the software implementing the organizing and consulting method according to the invention.

For navigation on the Web, by clicking on the Web chapter (or the tab), the book opens at a Web navigator operating in double-page mode. If he has already used this navigation tool, the user finds the log of the pages already displayed (the length of this log is a preference). When he clicks on a link on the left-hand page, the new page appears on the right. If he clicks on a link of the right-hand page, the page moves to the left and the new page is displayed on the right. If the user clicks on a URL link pointing to a non-HTML document, this document is retrieved and it is displayed normally on the-right hand page. If the user clicks on a link referencing a page already present in the navigation book, he goes to this page without changing the order of the pages.

The first page of the Web chapter is the welcome page of a public search engine (Yahoo!, Lycos, etc.; this is a user preference). When he is on the table of contents of the navigation book, if the user asks to view the detailed contents of the Web chapter, the method of management according to the invention shows him the tree structure of the last N Web pages consulted.

For navigation within the files, the first page of the Files chapter is the tree structure of the folders accessible from the workstation. From this page, he can navigate with the same approach as the Web navigation in double-page mode: if he clicks on a folder, the list of folders is displayed, with the documents which it contains. If he clicks on a document, its contents are displayed. If he clicks to the left, the details are displayed on the right; if he clicks on the right, the right-hand page moves to the left and the details are displayed on the right. If one of the documents displayed contains a URL link and if the user clicks on this link, the corresponding document is displayed normally.

The reader can nevertheless display the content of a folder without navigating (without changing page), by clicking on a triangular icon (same type of interface as on the table of contents of a book).

The pages thus consulted (subsets of the tree structure or content of the files) accumulate in the book; it is possible to move forward or backwards (particularly by clicking on one of the elements of the current access path repeated at the top of each page). The details which can be consulted from the table of contents of the book for the Files chapter consists of these pages recently navigated through in the file system (as for the Web chapter, the table of contents presents the last pages consulted). When the user closes the navigation book, all the intermediate pages navigated through in the tree structure of the folders of the file system are deleted (only the terminal path pages reached are kept).

For navigation through the electronic mail items (if the user has chosen to keep his electronic mail software as the default tool), a Mail divider is added to the SurfBook. The method of consultation is the same as that of the Files divider.

For navigation through a document database, the document Database divider lists the document databases accessible from the system. The system can be interfaced to the document databases by using mechanisms such as DMA or ODMA, for example. These tools allow navigation in a way which is similar to that of a file tree structure: the same mechanisms as before are repeated. They also have query mechanisms available to them. To that end, the first page has available both a visual display of the tree structure of the document databases and a space allowing queries to be formulated. When the user interrogates the database, a page displaying the results is inserted into the navigation book. These results are hypertext links enabling the previously described visual display mode.

For insertion of digitized documents, the system, particularly in the context of a business, allows documents to be inserted by digitizing them. The Digitization divider will offer access to standard interfaces of the TWAIN type. From this divider, the user can ask for a new document to be digitized, and it will be inserted directly behind this divider.

For insertion of pages into a book, when the user opens the navigation book, the book on which he was working is stored in the library or in the "Workbooks" compartment (one of the two compartments of the administrative shelf situated in the tools palette, always visible). During navigation, all he has to do is to drag the pages which interest him from the navigation book to the workbook of his choice. When he "releases" the page, a small menu appears so as to allow him to choose the place where the page will be stored, in one of the level-1 chapters, after the last page consulted or in a "filing" chapter (which will be created dynamically at the start of the book, and deleted automatically when it becomes empty). The displaying or otherwise of this menu is the subject of a preference.

In the workbooks compartment, the last book having received pages is "selected"; it can easily be identified (on the outwards section of the shelf, or outlined, or any other display trick). When there is a current book selected, although the user is in the navigation book, it is sufficient to click on a sensitive area (top right, for example) of the page to deposit it automatically into the currently selected book. The objective of this functionality is to offer a faster alternative than the drag-and-drop, which may prove to be tedious for a large number of pages. Its other benefit is that of not again proposing a choice of the place of storage in the destination book. As long as the user is in the same destination chapter, this rapid procedure for automatic pasting is used. If he wishes to change destination chapter, the user repeats a drag-and-drop (onto the same book or another one), and uses the small context-based menu to choose his chapter.

If the user inserts into a book a document which is already in it, the organizing and consulting method according to the invention says so, giving him the chapter(s) in which it is found, and asks him for confirmation of the multiple insertion.

In the case of navigation from an existing book, when the user consults one of his books and when he enters connected mode, he is authorized to navigate outside the book whenever he clicks on a hypertext link pointing to a document (file, Web, electronic mail) situated outside the book. When he clicks on such a link, he in fact inserts new pages into the current book. These pages are temporary, and may or may not be deleted when the book is closed.

If the user clicks on a hypertext link referencing a document which is already used in one of the books of his library, and if he is in connected mode (he is authorized to leave the book in the course of consultation), the organizing and consulting method according to the invention indicates to him that this document has already been used, and proposes to him either to go into the book where it is used (there may be several of them, in which case he is offered them all), or to navigate to this document and to insert a copy into the current book. The default response to this question is a preference (stay in the current book or go to the library).

If the URL references a document existing in another book of the library, the organizing and consulting method according to the invention proposes to the reader to open this book or to insert the document into the current book. If the document in question is one which is absent from the media library, and if the user is in connected mode, he may either remain in the current book and insert the document into it, or go into the navigation book in order to go in search of this new document. If he was not in connected mode, he is stopped there with a warning signal and/or the insertion of a page explaining the problem and/or an explanation from the wizard.

It is also possible to insert a blank document of one of the types available according to the applications installed on the system.

In the case of identification by content (search by keywords), the user wants the system to present him with the documents associated with one or more keywords. Based on the place at which he finds himself, and depending on the place where he wishes to search (inside or outside the library employed in the organizing and consulting method according to the invention), the user's thought processes are not the same, and consequently the interface proposed by the organizing and consulting method according to the invention is not the same.

The user wishes to know whether the subject is tackled in his library. He wants to find the location of certain keywords, for example in which books and on which pages is the subject in question discussed. This is an indexing logic situation, the interface of which is different depending on whether it is a page, a book, a selection of books or the entire library which is of interest (at each of these levels the user can nevertheless pass easily to the higher level—by typing in CTRL-F, for example, if this conventional shortcut of the office environment is chosen). At each level, an indicator makes it possible to see where the search has got to, in proportion to the extent of the domain examined. It also makes it possible to see that the search is under way (blinking, hourglass, etc.).

When this tool of the toolbar is clicked on, a search area is inserted at the top of the active page (this is a horizontal band of the same width as the page). It includes a field making it possible to input the word sought, and the conventional icons for searching for occurrences (first, last, next, previous, end of search). Occurrences successively pointed to are highlighted.

All the books of the organizing and consulting method according to the invention include an Index path, which constitutes the last chapter. In a real paper book, all the indexed words chosen a priori by the author are printed, and the reader chooses from these words the one which interests him. This reductionist approach is due to the limitations of the paper, but in fact the user knows which word he is seeking when he consults the index of a work. The index of the books of the organizing and consulting method according to the invention offers an approach which is more in accordance with the approach by the reader: an input area allows the word sought to be stated, and the software implementing the organizing and consulting method according to the invention automatically displays, below this area, a list of hypertext links pointing to the pages of the open book including the word. The user has options available to him allowing him to indicate whether the search should be carried out on the content of the document and/or on the annotations. It is also envisaged that a certain number of terms will be pre-indexed in order to replicate a conventional index.

In order to display its results, this index page, depending on the preferences or as a result of action by the user, take the appearance of a divider which is superimposed on the right-hand page of the book (loose-leaf divider), slightly offset (the right-hand page is partially visible). When one of the hypertext links resulting from the search is clicked, the book opens at the page in question (in the left-hand page position) under the index divider.

The thesaurus is a global index covering all the books; it is the last tab of the Catalogue book located on the administrative shelf. When this tab is clicked on, there is an input area on the right-hand page, allowing the word sought to be stated. The results appear on the same page in the form of a tree structure of the shelf unit/books/pages in which the keyword appears. The thesaurus behaves in the same way as the units for accessing the documents found, and uses the same property as the index of the books to become "loose leaf".

Moreover, the user will have the option of selecting a subset of books belonging to his library, so as to refine his search.

The user searches for the documents dealing with a given subject, in order to be able to integrate them into one of his books. He is interested in the documents themselves, not in the context in which they are found. This is a situation of document search logic, not one of document location logic. During the search phases, one element of the interface visually indicates to the user that the search is under way.

In the World Wide Web, the search function is undertaken by the search engine chosen by the user and accessible from the first page of the Web chapter of the navigation book. It should be noted that, thanks to the technology of PageLets, it will be possible to develop tools suitable for certain specific search engines in order, for example, to discard the duplicates of a search or to alter the display of the results.

In the files which are accessible from the workstation, a local search engine is employed. On the Web, the top of the page of search engines consists of the keyword input area, and the bottom often includes a thematic and hierarchical grading of the sites proposed by the service provider.

In the case of files, the same logic is repeated on the first page of the Files chapter of the navigation book: at the top, the keyword input area (local search engine), at the bottom the hierarchical grading already described (the explorer of the file system). If a keyword is input and if the search is launched, the right-hand page displays the list of files accessible from the workstation and including this keyword. It is possible to stipulate whether the search should be carried out on the name of the files and/or on their content.

In the other document sources, a suitable search engine is employed. Each document source (mail, news, EDM, etc.) is associated with a search tool accessible from the corresponding divider of the navigation book.

The creation of a book in the context of the organizing and consulting method according to the invention will now be described. For creating a blank book, the tools palette includes a New Book icon. When this icon is clicked on directly, a wizard is called making it possible to specify the properties of the book and to choose its visual representation. The new book thus created is empty, and becomes the book open on the desk. Like all the books, it has a table of contents and an index.

A book can be created automatically at any moment from an open document or from a search result, by dragging one of the following elements onto the New Book tool.

The Index page of an open book (or the thesaurus of the catalogue) containing hypertext links on all the occurrences of a keyword in this book (or in the library, in the case of the thesaurus). In this case, the book created includes all the documents thus referenced, without any depth. A wizard proposes to the user to copy or not copy the existing annotations into his new book.

Any page of the navigation book (whether or not the user is in the Web chapter or in the Files chapter). In this case, the book creation wizard includes an additional stage to indicate the depth desired for recovery of the document hierarchy.

It is also possible to create a book by importing the bookmarks from the current Web navigator of the workstation (the push information managed by the browser is also imported). This function will be proposed automatically by the installation procedure.

The user may moreover import folders present on his operating system, which will allow him to generate a new book or to create a new chapter in an existing book. This function can be implemented, for example, from a drag-and-drop operation.

All information generated by the system (Book, Annotation, etc.) is authenticated by the unique identifier of its author or of the person who altered this information. When the person generates a book, all the information relating to the user (and thus the author) will be inserted into the work. This information can be altered only by the author.

In this context, the author might decide to restrict access to the information via an encryption mechanism, using a password or access rights in the context of a workgroup architecture.

Hence, a profile (a sort of passport) is generated for each user, allowing him to be identified. This profile may be accompanied by a password.

Thanks to his profile, each user retains his working environment even if he is not accessing his data from his usual environment.

All the actions performed by the user are recorded in a journal. This journal may allow the user to find a document or the date and the details of an operation. The information stored in this journal could also be used to carry out various analyses: effectiveness of the storage and classification mode put in place by the user, efficiency of his use of the software, detection and analysis of certain types of behavior or of certain anomalies (redundancy, etc.). These functionalities could be supplied by third-party components, for example PageLets.

The various administrative books employed in the organizing and consulting method according to the invention will now be described.

The navigation book includes one chapter per source of documents (Web, Files, document databases, electronic mail, etc.). Whatever its source, any document external to the library can thus be inserted into it via the navigation book. Like all the books, it also includes an index making it possible to search for the occurrences of a keyword in the pages which it contains. The navigation book can be annotated.

In a first embodiment, the catalogue of the software implementing the organizing and consulting method according to the invention includes four chapters: the list of the current subscriptions (push), the catalogue of the keywords used, the thesaurus and the PageLets which are downloaded or installed on the workstation.

The list of current subscriptions describes all the automatic updates programmed into the library, with, in each case, the pages in question, the books to which they belong and the update frequency. The user has the option of canceling or altering these various subscriptions.

The catalogue of keywords brings together all the different keywords appearing at least once in one of the fields for qualification by keyword or one of the keyword notes of the pages of the library. These keywords are sorted alphabetically. The user may, if he so wishes, delete a keyword from this catalogue.

The thesaurus is the last chapter of the catalogue: it replaces the index which is usually found in the books. This book may also accommodate a chapter for the catalogue of stickers.

The book of references brings together all the parameters for configuring and customizing the software implementing the organizing and consulting method according to the invention. The operating principle adopted for setting the parameters for the preferences is as follows: during installation, only those parameters which are vital to the correct operation of the software implementing the organizing and consulting method according to the invention will be specified. The "comfort" preferences, determining the default behavior of the software, will be requested from the user only when they are encountered and used for the first time.

The help book allows help to be found for the software implementing the organizing and consulting method according to the invention within the metaphor of a book. It uses the HTML format and hypertext links making it possible to navigate easily from one heading to another. As in all the books, an index makes it possible to search for a given keyword quickly.

Electronic mail can be integrated into the organizing and consulting method according to the invention in at least two ways: either as an external document source, in which case it is managed by the Mail separator of the navigation book, and the user keeps his usual electronic mail management software; or the entire power of the metaphor of the book is utilized, by integrating electronic mail closely within the organizing and consulting method according to the invention.

This closer integration then takes the form of a fifth administrative book, the mail book. This book offers the functionalities of an electronic mail software package, with the following added value:

user friendliness and simplicity of the metaphor for organizing and classifying mail, for finding it by using the index, etc. Incoming mail and its attachments take the form of sub-chapters of the received mail chapter. If the user wishes to convert incoming mail and its attachment into a book, he only has to drop this sub-chapter onto the new book tool;

option of annotating the received mail: the received mail cannot be altered in conventional electronic mail software, in order to preserve the integrity of the message as it was formulated by the sender. The option of annotating received mail in order to add comments to it without in any way altering its integrity constitutes substantial added value;

storage of the electronic mail in other books: as is the case for all the pages of the books employed in the organizing and consulting method according to the invention, the user can store electronic mail in another book, with documents originating from other sources but dealing with the same subject.

The organizing and consulting method according to the invention may advantageously include a classification mode based on the number 7.

The preferred organization method is based on the number 7. This number is recognized as being the maximum number of elements that a person can perceive and comprehend simultaneously. Ideally, each node of a tree structure should contain 7 elements at most. However, an exception can be made to this rule in the case of a tree structure of files. This is because each node may contain two distinct types of elements: sub-nodes and leaves. A node may therefore, without disturbing perception too greatly, contain 7 sub-nodes and 7 leaves. Likewise, the depth of the tree structure should be a maximum of 7. The root is of depth 0.

The hierarchy is broken down in the following way:

Shelf unit
  Shelf
    Book
      Chapter
        Document/Page

The depth is 5, and has the special feature of being fixed, which gives it a great superiority over a conventional tree structure. Every document/leaf is located beyond depth 5. That can also be compared to the position of a document on the Web; it can be at depth 1 as well as at infinite depth.

Hence there are 7 shelf units available, each capable of containing 7 shelves, i.e. 49 shelves. Each of these 49 shelves may contain:

First case: 7 books, i.e. 343 books, or

Second case: 14 books, i.e. 686 books

First case: Each of the 343 books may contain 7 chapters: i.e. 2401 chapters, or Second case: Each of the 686 books may contain 7 chapters, i.e. 4802 chapters This illustrates clearly that the number of storage units is ample for a conventional use.

For a file system, the hierarchy is broken down in the following way:

Folder/Document
  Sub Folder/Document
    Etc.

A document may be stored at any level whatever, thus complicating the search process.

Several display modes will now be described. In order to allow advantage to be taken of these elements, 6 display modes have been designed. These 6 modes make it possible to display the information at different levels, allowing productivity to be enhanced, depending on the type of processing which the user wishes to carry out. It is important to state that these various modes "follow" each other and correspond to zooming closer to or further from the information. This number of modes is not restrictive, and new modes could be added so as to supplement the user's view of the information. These various modes may coexist with one or more windows simultaneously visible on the screen, or be mutually exclusive (one mode at a time filling the screen).

The library mode allows a macroscopic display of the information. It makes it possible to display the library in its entirety. The 7 shelf units, the 7 shelves per shelf unit and the books standing on these shelves are visible.

The objective of this mode is to:

reorganize the books among the various shelves, choose the working shelf (particularly for the lectern mode), access a book which is not present on the working shelf.

It is also possible to:

Rename a shelf or a shelf unit

Export and import a book

Print a book

Change mode

Delete a book

It is possible to design a media library, an element lying at a higher organizational level and allowing a user community (particularly in a company), by virtue of an authentication and encryption system, to share all the personal or shared libraries of the company. This level may itself be encapsulated within a wider entity, etc.

Each shelf unit has a specific color which allows it to be easily identified when the user is working in lectern mode.

This mode also has two special shelves available: the system shelf and the workbooks shelf. The system shelf brings together the preferences book, the catalogue, the help book and the navigation book (SurfBook). The workbooks shelf groups together the books placed there specifically by the user. This makes it possible for him to have his latest workbooks constantly "to hand". According to another implementation, the shelves will be arranged within a tools palette present in all the visual display modes.

The lectern mode is the interface between the library mode and the book mode. Its special feature lies in its ability to offer certain functions of the library mode and of the book mode. It makes it possible both to display each shelf unit individually and to consult the current book in miniature but nevertheless readable form.

The user can change the active shelf unit (by selecting the shelf unit number), he can rename each of the shelves, shift books within the current shelf unit, delete and create books.

The mini-book is placed on a "lectern" and allows the current book to be consulted. Each document is represented in a "fit to screen" mode, allowing the document to be rapidly identified. It makes it possible to leaf through the book, to consult and edit the table of contents, etc. The power of this mini-book (and this is in fact its special feature) is the ability to choose the workbook very rapidly, without having to make journeys backwards and forwards between a library mode and a book mode. It constitutes an ideal balance between a macroscopic view of the organization of the data and the direct consultation of the information. This mode also has available the system shelf and the shelf with the last workbooks (or the tools palette if this implementation is preferred).

Figure 6:
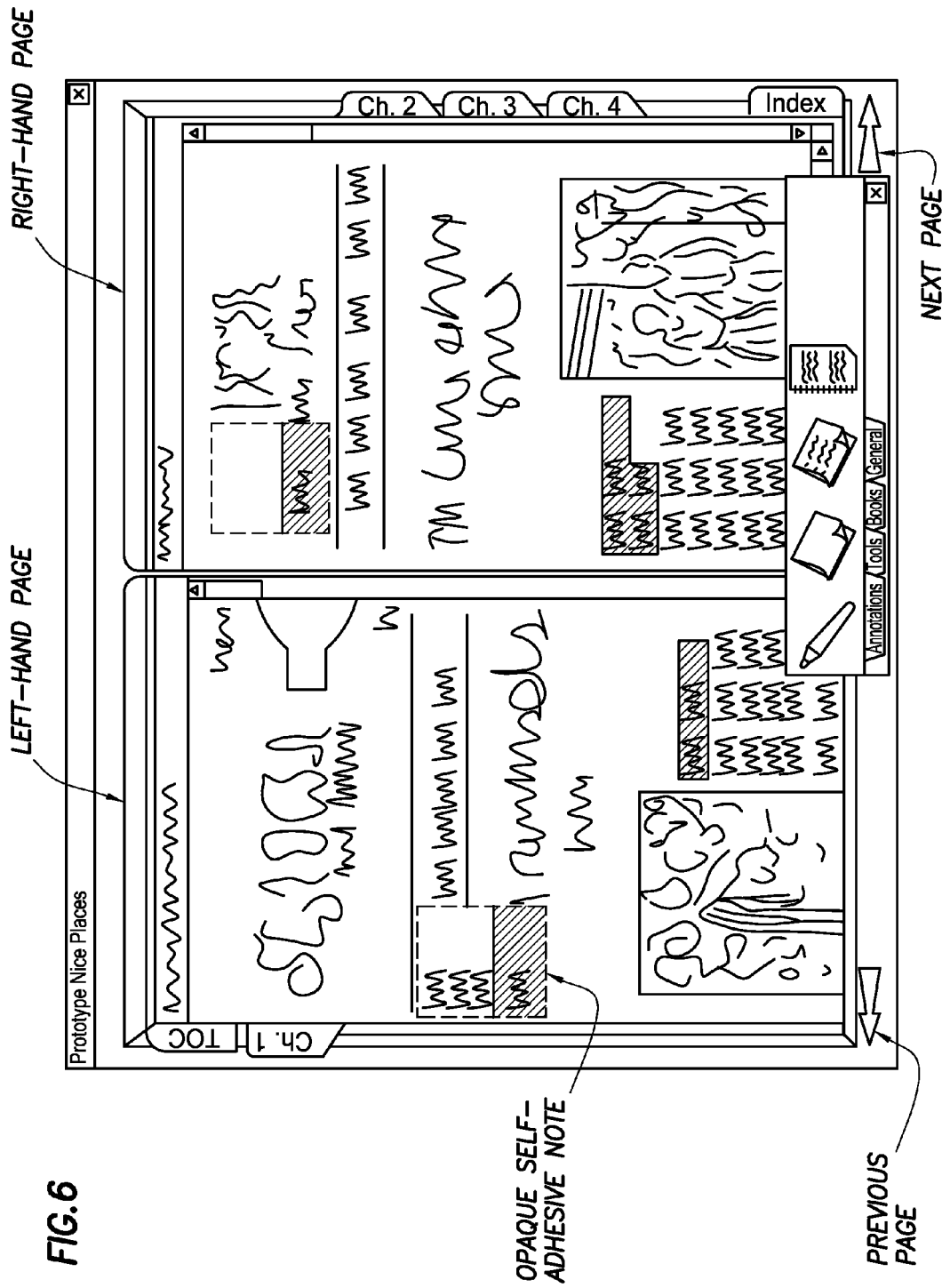
FIG. 6 is a screen copy obtained with the method according to the invention, illustrating a visual display in book mode.

The book mode, illustrated by FIG. 6, is much more than a transposition of the book into the electronic world. It allows consultation, editing and reorganizing of documents within a universal link: the book. All the types of documents may be incorporated into the book: queries to databases, local or remote office documents, Internet documents. This book mode is not only a simple juxtaposition of two pages; it has many innovative elements:

The binding: this offers many innovative functionalities. Its visual appearance denotes the status of the book: alterable or not. It is possible, by way of example, to conceive of a binding with rings stating that the book is alterable, and a fine stitched binding conveying that the book is not alterable. The binding also makes it possible to have access instantaneously to any page by means of a cursor, a function similar to a scroll bar but extended to the concept of leafing through independent documents. Moreover, the user has the ability to activate a quick-look tool while scrolling: when the user shifts the cursor, keeping the mouse button held down, a mini-book appears, displaying the 2 pages located at the cursor level. By a simple sideways shift of the binding, it is also possible to alter the appearance of the book by enlarging one of the two pages at the expense of the other. The binding as a whole represents 100% of the pages. The top of the binding references the second cover page, the bottom, the index.

Two actions altering the read position in the book are possible: page changing and leafing through the book. Page changing: the reader lets the mouse pointer run along the binding. An information bubble informs him of the number and of the title of the pages. When he has chosen the page he wishes to consult, one click with the mouse on the binding causes the page to change.

Leafing through the book: the reader shifts the position cursor, located on the binding, using his mouse. As he shifts the cursor, an information bubble appears giving him the number and the title of the page (or else the quick-look tool described above), the pages of the book turn over to reflect the position of the cursor. All the time the cursor is moving, a pastel cursor indicates the starting position. When the user releases the cursor, the pastel cursor disappears.

If the jump made exceeds two pages, the page marker is placed at the spot from which the user started out.

The tabs are allocated to each group of pages: the chapters. For each level-1 chapter, there is an associated tab. The tabs make it possible to access dividers each delimiting level-1 chapters of the book. The position of the tabs is that of the dividers in, a binder. The table of contents of the chapter is displayed on each divider. This table of contents is fully dynamic: it can be expanded/condensed or edited.

Bookmarks: these are the equivalent of the self-adhesive notes placed at the top of a page, in the book world. They make it possible to identify a page visually and via the description which the user has been able to insert. The user can also chose the color of the bookmark.

Loading tabs: when a document is in the course of loading, a tab is associated with the document and reflects the state of progress of the loading. This tab is narrower than the tabs of the dividers. This tab includes a stop button which gives the user the capability of stopping the loading of the page. In this case, the loading tab disappears. If the user leaves the mouse on top, an information bubble then appears and gives the title of the page as well as the data rate of the connection. At the end of the loading, the temporary tab disappears.

The title/URL area: this area has the particular feature of being both an input area for the path of the document (URL for an Internet/Intranet document) and an area for displaying the title. When the document does not have a title, it is its address which is displayed in this area. The user can choose to display the title or the address. As soon as the user "enters" this area, it changes to edit mode.

The way the book functions has been optimized so as to allow better consultation of the documents, particularly on the Internet. In is known that the mind, to work, needs spatiotemporal references: when the user turns the right-hand page or clicks on a hypertext link on the right-hand page, the organizing and consulting method according to the invention offsets the right-hand page leftwards and displays the new page on the right-hand page. This makes it possible, particularly in the context of a utilization on the Internet, to continue to consult the previous page while the new page is loading.

The user may at any time decide to make a divider "loose leaf". By way of example, the case of the table of contents or of the index may be quoted. Once a divider is loose-leaf, it occupies one of the two sides of the book and remains visible all the time the user is working.

Navigation arrows make it possible to move to the next page or to the previous page of the book.

The notebook mode is an extension of the book mode. The difference between the book mode and the notebook mode crops up only in the positioning of the binding. In the case of the notebook mode, the binding is placed horizontally allowing, among other things, better legibility of the information on screens with low resolution.

Figure 7:
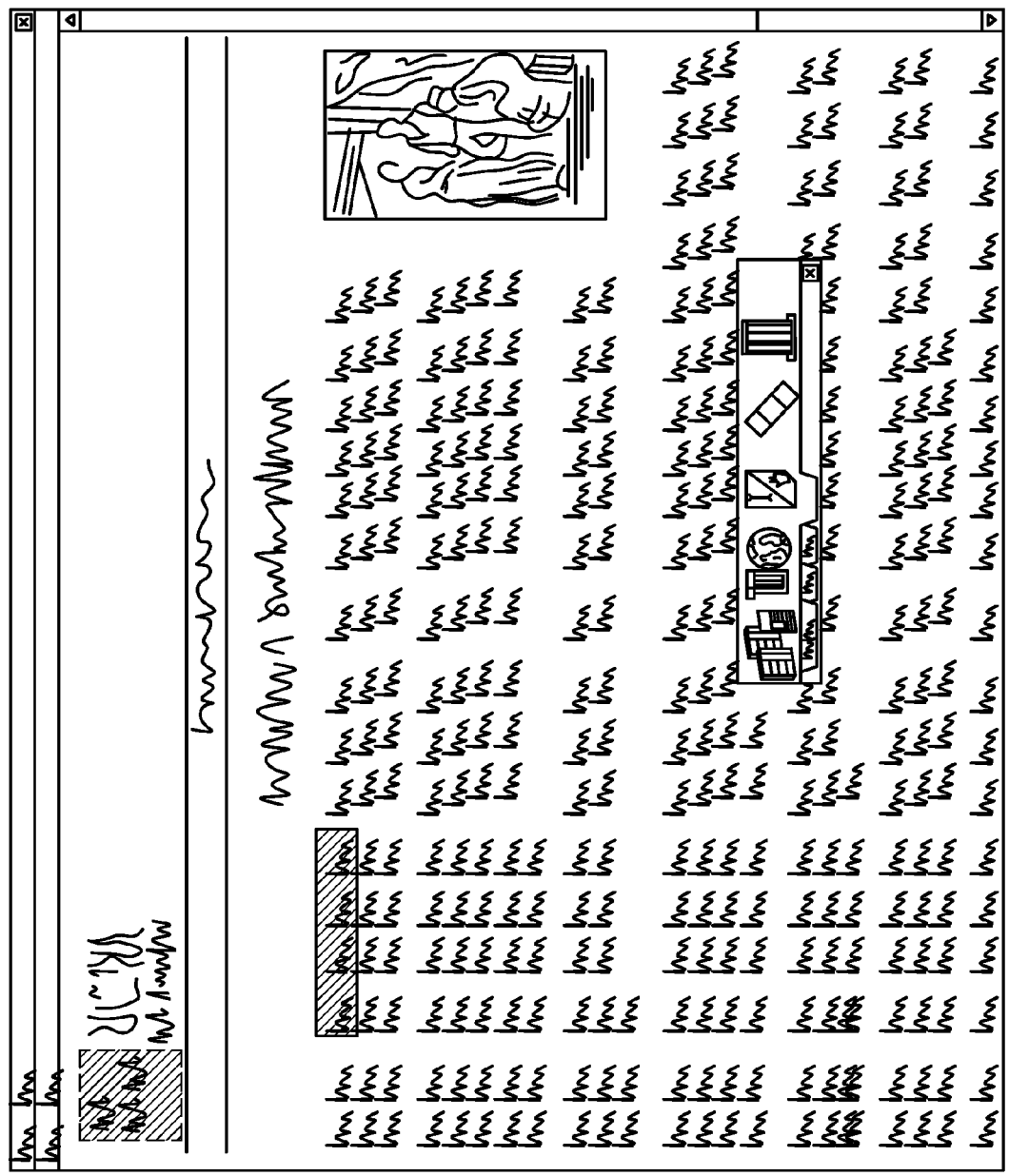
FIG. 7 is a screen copy obtained with the method according to the invention, illustrating a visual display in page mode.
Figure 8A:
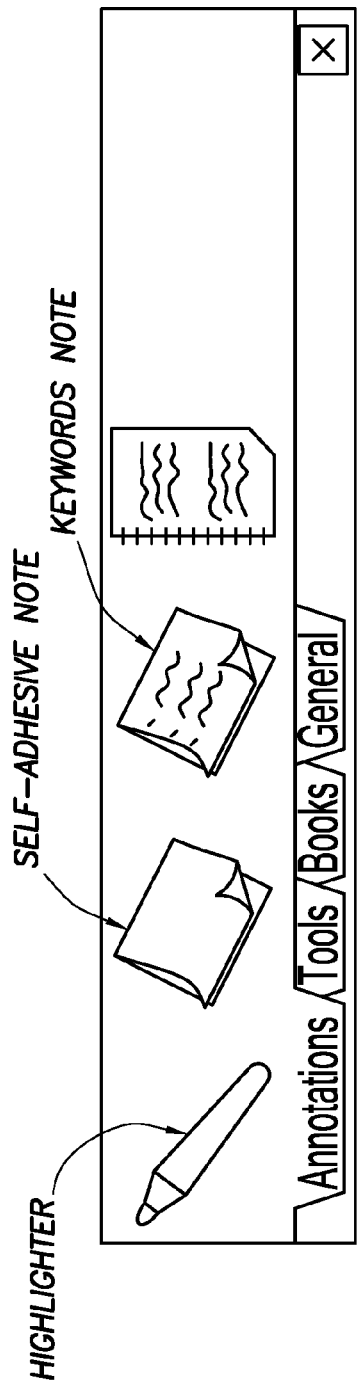
FIGS. 8A to 8D are screen copies obtained with the method according to the invention, illustrating a tools palette, in which the tabs "Annotations", "Tools", "Books" and "Modes" are activated successively.
Figure 8B:
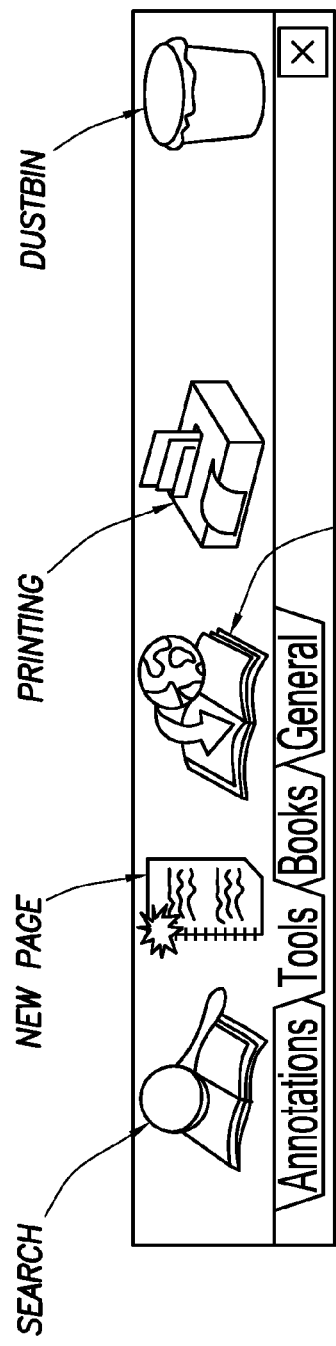
Figure 8C:
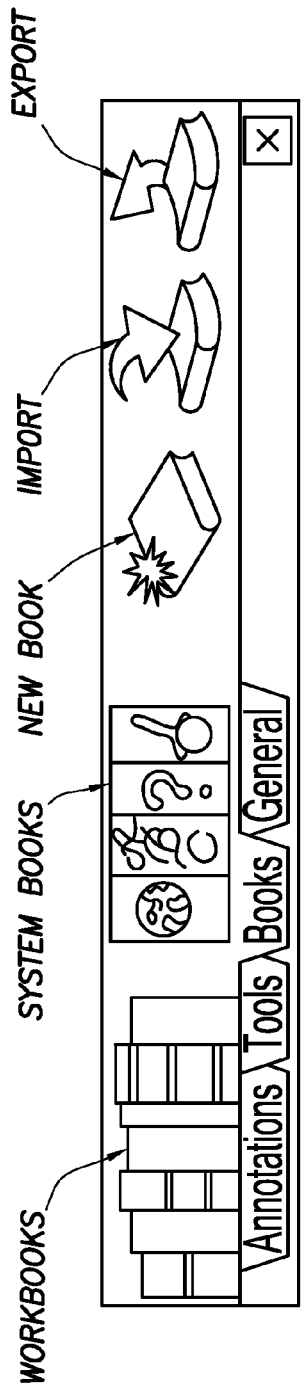
Figure 8D:
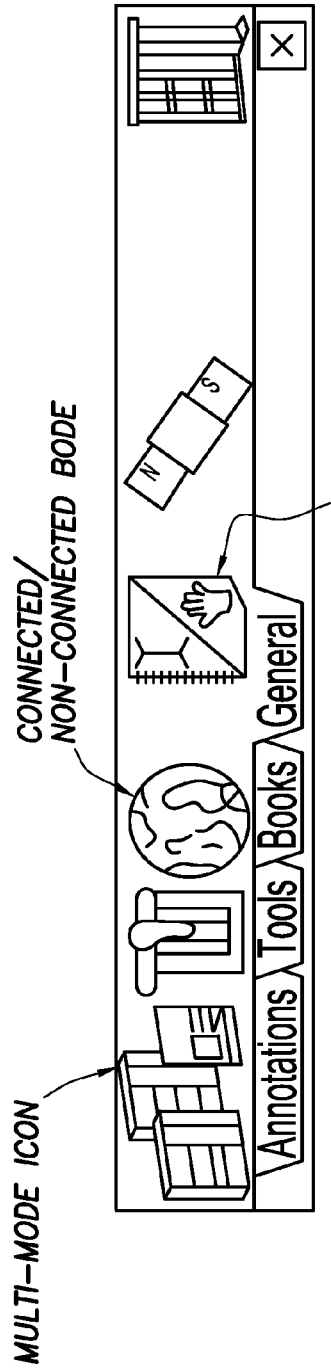

The page mode, represented in FIG. 7, is the most exclusive of the visual display modes. It makes it possible to look up and/or to edit a single document and to reproduce it optimally. All the graphics elements and the tools disappear in favor of the document. Only a page bar situated at the top of the document repeats the context of the organizing and consulting method according to the invention. The main tools can be called in the form of a loose-leaf menu or of a tools palette, displaying of which is controlled from the page bar (and by a keyboard shortcut).

The sorting mode is an "expanded" mode in which each page is represented by a small image known as a vignette. Several vignettes can be displayed simultaneously on the screen, and the contents of the book can be reorganized simply by shifting these vignettes. A page can also be deleted by deleting a vignette. A background color code can be used to represent the level-1 chapters; for the other levels, the numbering of the vignettes indicates their positioning in the hierarchy of the book. The title of the page is displayed in an information bubble when the mouse passes above the corresponding vignette.

In order to allow the user to navigate efficiently through the various consultation modes, an innovative tool has been developed: the multi-mode icon. This icon makes it possible to move instantaneously into one of the modes while being aware of which mode the user is in. Depending on where the user places his pointer on the icon, the latter changes its appearance to emphasize the anticipated mode.

Once the user has chosen the mode, all he has to do is click to confirm his choice. If there are N modes, the icon may therefore have N×N aspects (combination of the chosen mode and of the current mode). A limited version of this icon may be confined to identifying the mode chosen without the current mode: N aspects (there is always a chosen mode).

The tools palette, as represented by FIGS. 8A to 8D, is visible in all the visual display modes. This tools palette consists of several tabs grouping together the main functions by topic: annotations, books, modes, tools.

Annotations: highlighter, self-adhesive note, keywords note, books: workbooks (at the user's choice), system books, creation of a book, importing of a book, exporting of a book, modes: multi-mode icon, connected/non-connected mode, consultation/selection mode, exit from the product, tools: search, new page, replication of remote data, printing, dustbin.

On the base of the palette, there also exist (regardless of the tab selected):
  a connected/non-connected switch
  a shortcut for choice and for indication of the consultation mode.

The most widely used method of consulting electronic documents is by printing them out. In order to enhance the consulting of electronic books, the printing format used is as faithful as possible to the book. By using single sheets to the A4 or US letter format, the user has a real book available. During printing, all the constituent parts of a book are printed: first and second cover pages, table of contents, documents, index, etc.

The organizing and consulting method according to the invention may also advantageously include the functions of voice recognition and read back.

The consultation system, as it is described, allows voice recognition components to be added, making it possible to speed up the consultation and to enhance the use of the software. Thus, all the functions will be accessible by recognition of voice commands "Next page", "Next chapter", "New book", etc. It will also be possible to add documents reading elements (capable of being coupled with the voice commands): "Read the document", "Read the annotations", etc.

These capabilities may also be use for visually impaired or physically disabled persons.

The environment can change language "on the fly": all the menus, texts and icons can be altered dynamically by changing the country in the preferences work. This also comprises special regional features such as the direction of reading. The case of Arabic may be quoted, where the reading of a book is reversed (by comparison with European languages). Thus the positions of the table of contents and of the index will be interchanged. Many alterations as to the appearance of the software and of the methods of access to the data are applied.

Another aspect of the present invention will now be described, covering the flow and the storage of electronic data. The various states of the information, the processes which may affect their status and the methods of access to them are involved. It will be recalled that the information can be represented in any form of electronic documents originating from any source: HTML (HTTP, etc.), office computing (file system), databases (relational databases, document databases or objects), electronic mail (SMTP, POP, etc.), Newsgroup (NNTP, etc.).

The organizing and consulting method according to the invention may operate in connected mode or in non-connected mode.

In connected mode, the software allows on-line navigation on the Internet. By clicking on a link or by navigating with the Navigation Book, the organizing and consulting method according to the invention can establish an Internet connection.

In non-connected mode, the software does not allow on-line navigation on the Internet. If the user clicks on a link pointing to the Internet, an audible signal reminds him that he is in non-connected mode, and the icon representing this mode blinks once or twice.

These two operating modes are still possible, even if the user has a permanent connection available. This is because these two modes have two dimensions: economic (the connection may be chargeable), and functional (I am or am not in a free-navigation and search phase). In consulting a book, an accidental click on a hypertext link should not entail navigation on the Internet, except if the user declares himself ready to do so by choosing the connected mode.

The functions of storage, expiry date and of updating of documents will now be described. The behavior of the organizing and consulting method according to the invention depends on the protocol used to gain access to a document.

The documents accessed via. HTTP are regarded as transient; they may be compiled on the fly by the HTTP server consulted, depending on the navigation performed by the user. All the documents thus collected and preserved in his books by the users are therefore stored by the software implementing the organizing and consulting method according to the invention in its internal database.

Involving, as it does, temporary pages in the Web chapter of the navigation book, the user has the option of indicating that the pages which he is in the process of consulting (and thus of adding to the navigation book), are not to be kept. They are automatically deleted upon closure of the navigation book.

As far as the documents which are accessed via the file system are concerned, the files stored in the local storage units of the workstation are not duplicated; their access path (URL of the type file:) is registered when they are referenced within a page of a book used in the organizing and consulting method according to the invention.

In the case of the network units, the default behavior is a preference: the documents are either reference on the network unit (preferable for a static workstation), or copied onto the local unit (preferable for a portable workstation). The network documents copied onto the local unit are identified as such, the location of the original is stored in memory by the software implementing the organizing and consulting method according to the invention. In this case, the behavior of the organizing and consulting method according to the invention is as follows:

In consultation mode: when the network unit is accessible, the organizing and consulting method according to the invention verifies, before using its local copy of the document, that it is still up to date. If a more recent version exists, it is retrieved. If the network unit is inaccessible, the local copy is used.

In alteration mode: only the original is alterable. If the user wishes to call the application allowing the document to be altered, the organizing and consulting method according to the invention calls it on the original document (network), if the latter is accessible (otherwise the alteration is not authorized).

In the case of documents accessed via a document database, the software implementing the organizing and consulting method according to the invention incorporates "versioning" mechanisms. Depending on the working mode, two strategies are implemented.

Consultation mode: the most recent version of the document is displayed, but no alteration is possible ("get latest version").

Edit mode: the software implementing the organizing and consulting method according to the invention attempts to perform a "Check out" of the document. This has the effect of verifying whether the document is already being edited. If this is the case, the user cannot edit the document. In the opposite case, a lock is set, the document is retrieved locally and the user has exclusive access for alteration. When the user terminates the editing of the document, the altered version is sent to the document database which updates the document and releases the lock: "Check In".

When a document is digitized from the SurfBook (digitizing divider), the image of this document is kept in the cache but may be deleted depending on the needs of the cache. Once the image has been transferred into a work created by the user, the image of the document is kept definitively by the system: it can be annotated and possibly edited.

On the subject of electronic mail, the user has two options: either he keeps his electronic mail software, and in this case it is regarded by the organizing and consulting method according to the invention as an external document source; the paragraph which follows thus details the way in which this source is integrated into the organizing and consulting method according to the invention. Or the user, for management of his electronic mail, wishes to take advantage of all the power of the metaphor of the book, and in this case he can use the mail Book, one of the administrative books of the software implementing the organizing and consulting method according to the invention which are described above in this document.

If the user prefers to keep the electronic mail software already available on his workstation, his mail can be consulted from the Mail divider of the navigation book. This divider presents the various folders in which the user's mail items are held. To gain access to this information, the software implementing the organizing and consulting method according to the invention uses a standard MAPI-type protocol. The mail can be consulted and annotated in the navigation book; each mail item consulted is allocated to a page. The electronic mail inserted into books is copied and stored in the internal database of the software implementing the organizing and consulting method according to the invention.

As with the electronic mail, if the user makes use of access to newsgroups he may consult them from the corresponding divider of the navigation book. These messages being by nature transient, they are systematically copied when they are inserted into a book. It is also possible to envisage the creation of a book of discussion groups (NewsBook).

The software implementing the organizing and consulting method according to the invention uses the expiry date information supplied by the Web servers (directly in the HTTP protocol or via a CDF-type format) to describe the "freshness" of a document. Documents regarded as time-expired are identified graphically (struck through with a fluorescent red diagonal, for example). The books containing time-expired documents are also identified graphically (fluorescent red wedge on the edge, for example). The user can, at any moment, request re-updating of a time-expired page, or of a book including time-expired Web pages. He has the option of indicating whether the new version should replace the old one, or whether it should only be added.

The user can also indicate the date on which information may be purely and simply extracted.

The user has the option of programming an automatic and regular re-updating of certain pages. When push information is available, it is used by the organizing and consulting method according to the invention to set the parameters for this updating. Otherwise the user himself has to set the parameters for the frequency of the updating. The user may, in all cases, indicate whether the new pages should replace the old ones, or whether they should be added to them. In the event of replacement, he indicates whether any annotations should be deleted or, on the other hand, allocated to the last update. The user can program the re-updating by determining for himself the lifetime of the information and thus its update frequency: daily, weekly, monthly or annually.

Whenever the user changes to connected mode and when updating is necessary, the organizing and consulting method according to the invention automatically starts these updates, but allows the user to stop them (if he wishes to have the entire bandwidth available). A preference makes it possible to force the organizing and consulting method according to the invention to ask the user for authorization to run the updating before it actually starts. The pages and the books which have been updated but not yet consulted by the user are marked with a fluorescent green indicator. The "subscriptions" chapter of the catalogue groups together all the automatic updates programmed into the library employed in the organizing and consulting method according to the invention.

For an advertising push, the software implementing the organizing and consulting method according to the invention may use advertising banners at various regularly accessed places (administrative books, index pages, thesaurus, etc.). When an Internet connection is established, the software implementing the organizing and consulting method according to the invention may automatically receive new banners.

It is also possible to push complete books, for example mail order catalogues which are thus updated, or even encyclopaedias delivered initially on CD-ROM them updated by the push mechanisms.

As regards books or dossiers in the image of a remote data source (Internet, database, etc.), the user can also program the creation of a complete or partial "image" of a remote data source (Web site, for example). He specifies the data source and its address (as well as numerous options, such as the depth of the mirror in the context of a hierarchical structure the maximum size off the image created, etc.), and chooses to create a new book or else a new folder in the current book. This new element created has the specific feature of being able to be updated automatically (Cf push), but by grouping together a set of pages.

The information, according to its origins: web, mail, file system, Intranet, document database, is identified in a specific way. This lets the user know the information which he controls.

A Web accelerator mechanism allows pre-loading (in the cache) of remote document identified by hypertext links and located in the pages being consulted by the user.

The books compiled by a user are kept in his library, which thus contains the knowledge accumulated by this person in electronic form. One of the trump cards of the organizing and consulting method according to the invention is that of allowing this knowledge to be shared and transmitted to third persons in a form which not only adds no technological barrier to this transmission and to the use of the knowledge transmitted, but which moreover greatly enhances this content by giving it the appearance of a book, a valued object, familiar, respected and universal.

These transmission functions come into their own when they are combined with the search tools (for example, search on keywords). Whereas the user can send one of the books present in his library, he can also dynamically compile a new book by searching in his library for all the documents containing one or more keywords. These keywords can be sought in the documents themselves or in the annotations added by the user; in this case, this may involve, for example, the initials of a colleague. The book thus generated will contain all the annotated documents which the user will have anticipated will be of interest to his colleague. These functions of knowledge transmission are implemented on the basis of export and import mechanisms.

The user can drag one or more books onto the Export tool. The Export wizard asks him whether he also wishes to export the annotations, whether he wishes to export the contents or only their references (URL), whether he wishes the book to be alterable or not by the user, etc. When exporting keyword notes, the user can indicate whether he wishes to extract them on completion of the operation (notes which have no further purpose once the documents have been exported). He also indicates whether he wishes to export the visual display tool of the software implementing the organizing and consulting method according to the invention with the book, in order to be able to send it to an addressee who might not have the software. It is also possible to send the book in a form which cannot be altered but can be consulted in a Web navigator. There are therefore three cases in point:

Only the book is exported in a compressed data file, readable by the Import function of the full software associated with the organizing and consulting method according to the invention. The exported file is self-extracting executable code including the viewer of the software implementing the organizing and consulting method according to the invention and the compressed book. The viewer is an application allowing a book and its annotations to be consulted, without it being in any way possible to alter it or navigate out of the book (the viewer also makes it possible to download the full version of the software).

The book is converted into a hierarchy of Web pages allowing it to be consulted from a standard Web navigator. Here again, a hyperlink makes it possible to download the full software. All the documents are converted into a format recognizable by the navigator (HTML, XML, etc.), while preserving their annotations.

The last step of the wizard makes it possible to stipulate what should be done with the exported book. Three choices are possible:

store the book in a file; in this case the operating system's standard Save As dialogue box is used.

use the workstation's electronic mail software to send the book directly to an addressee (by using the MAPI software interface).

use the mail book of the software implementing the organizing and consulting method according to the invention to compose mail and send the book.

When the Import tool is clicked, the import wizard asks where the imported book should be sought. Two cases are possible.

For a local file, a standard Open File dialogue box appears. The user designates the file associated with the organizing and consulting method according to the invention to be imported, then confirms.

For electronic mail received by the user's mail software, the organizing and consulting method according to the invention uses a MAPI-type interface to detect the mail items identified by the organizing and consulting method according to the invention as including books.

The wizard then asks where to store this book in the library, and whether this book is to be opened automatically on the lectern and become the active book. This procedure recognizes all possible export formats of the software implementing the organizing and consulting method according to the invention (native book, book with viewer, Web book).

The majority of the pages of a book employed in the software implementing the organizing and consulting method according to the invention are a structure for reception of contents external to the application, chosen by the user as coming within the context of the book. This content may be static (office documents), navigable (Web pages) or interactive (HTML controls, JavaScript, applets—Java application components, etc.).

Even in the case of interactive contents incorporating a behavior characteristic, no interaction exists between these external contents and the structure of the book employed in the organizing and consulting method according to the invention into which they are inserted.

There is another species of pages, which might be called system pages: these are the pages which allow the user to influence the structure of the book, whether this is to consult it (index, table of contents, etc.), or to alter it (reorganization of the table of contents, for example).

A PageLet (contraction of page-applet) is a page of a book employed in the organizing and consulting method according to the invention having access to the structure of this book. The definition of a generic technology for the technical architecture of the PageLets has two advantages:

it structures the development of all the PageLets integrated as standard into the product;

it defines a standard allowing third parties to develop and to market PageLets.

To achieve these objectives, the PageLets have to be reusable software components, exhibiting and utilizing standardized interfaces independent of the languages. PageLets may also be scriptable, that is to say that the functionalities which they offer may be executed either interactively by the user or automatically by a scripting environment.

The interfaces provided by the organizing and consulting method according to the invention to a PageLet allow it to obtain a reference to the book into which it is inserted. Once the PageLet has available a reference to the book in which it is located, it can use it to access the various interfaces supplied in the PageLet development kit. These interfaces make it possible, in particular, to go to a given page, to insert pages into the book, to know which chapter one is in, to reorganize the book, to access the content of the other pages of the book, etc. Interfaces are also provided for the PageLets in order to allow them to subscribe to certain events triggered by the software implementing the organizing and consulting method according to the invention, when the contents of its database are altered. The PageLets may, in this way, react directly to the alterations made in the library or in the book into which they are inserted.

The PageLet should, moreover, be able to be identified within the environment specific to the organizing and consulting method according to the invention, so that the latter can present the main characteristics of the PageLet to the user. This identification may also be combined with a level of certification of the PageLet, allowing or not allowing access in read or write mode to the current book, or even to the other books of the user's library.

By using the software implementing the organizing and consulting method according to the invention, the user could, for example, access a Web site offering a catalogue of downloadable PageLets. The PageLet standard will include, for example, the definition of a specific HTML tag allowing software implementing the organizing and consulting method according to the invention to detect that the resource referenced by the Web page consulted is a PageLet. If the user decides to download the PageLet, the software implementing the organizing and consulting method according to the invention will store it automatically in the "PageLets" chapter of the catalogue. This chapter will include a page for each of the PageLets thus retrieved by the user. This page will present an preview of the PageLet, its description, its version, its creation date and the identification of its author (the software implementing the organizing and consulting method according to the invention will obtain these items of information whenever the PageLet is registered in its environment). The user could then insert the PageLet from the catalogue into any one of his books.

It can also be envisaged that certain PageLets may come to replace (and not supplement) certain standard functional features of the software (the index, for example).

A few examples of possible uses of the PageLet technology by third parties are given below:

"automatic summary" PageLet:

companies specializing in the management of documentary resources make use of technologies for linguistic analysis making it possible to generate a summary from one or more documents dealing with the same subject. They could develop a PageLet for insertion at the start of a chapter or of a book, displaying the summary of the chapter or of the book.

"search engine" PageLet:

A company making use of special-purpose technology for advanced searching in documentary resources or on the Web could create a PageLet enabling the user to formalize his search, the result being produced in the form of pages, chapters and sub-chapters generated, inserted and organized by the PageLet.

"reorganization" PageLet:

After having visited some tens of Internet sites in the course of a search session, a user may find himself with hundreds of pages in his book, all "on one level" and difficult to make use of as they are. A company specialized in lexical and thematic analysis of data could offer a PageLet capable of completely reorganizing the contents of a chapter or of a book, by grading its pages by topic and sub-topic. It could also offer a special-purpose graphical representation of the contents of the chapter.

"statistics" PageLet:

After heavy use of the various sources of information at his disposal, the user wishes to know how his working hours are divided among the various sources, how many times he went to consult such a document, etc. This PageLet could be developed by virtue of the mechanisms for subscribing to the various types of events. It could offer real-time information on frequency of use, time of use, quantity of information stored, level of filling of the library, etc., for example by means of VU-meters, etc.

"decision support" PageLet:

On the basis of the statistics and journal-keeping tools, it is possible to implement tools for helping with making decisions, with preventing errors or with macroscopically studying the activities of a user. It will thus be possible to advise the user that he has already sent a document to an addressee, that numerous documents are redundant in his library, that certain books have not been consulted for a long period of time, that the user often accesses one document but spends only a limited amount of time on it, that his subscriptions (Push) consume a large part of his bandwidth, that certain subscriptions are only rarely consulted, that, given the elements which he consults regularly, it would be beneficial to subscribe to some source of information or even to access some type of document, etc.

For formalizing the interfaces, two implementation techniques can be envisaged for the PageLets, a special-purpose ActiveX binary component or a Web page including scripts accessing the interfaces offered by the software implementing the organizing and consulting method according to the invention.

In the case of an implementation of PageLets in the ActiveX form, a PageLet having the ActiveX form will have the following features:

it should implement standardized and defined binary interface standards;

it uses a software interface for access to the books.

Several examples of binary interfaces exhibited by the PageLets will now be presented:

IRegisterPageLet: this first interface is the one allowing the software associated with the organizing and consulting method according to the invention to receive an ActiveX component while recognizing it as being a PageLet, so as to be able to store it in the catalogue of PageLets and thus to allow the user to make use of it (by inserting it into one of his books). This interface includes the following method, in particular:

GetDescription (used by the software implementing the organizing and consulting method according to the invention to obtain the author, the textual description and a graphical representations of the PageLet, this information allowing him to insert this PageLet into the PageLet chapter of the catalogue of the library).

IUsePageLet: this interface is the one used by the software implementing the organizing and consulting method according to the invention when a PageLet is called up to be inserted into a book. The call is made via the CreateInstance method of the IClassFactory2 standard interface if it is implemented by the PageLet, or else by the method of the basic IClassFactory interface (in this way, the PageLet writers are allowed to control the rights and the licenses for using their PageLets, this functionality being accessible only via IClassFactory2). IUsePageLet includes the following method, in particular:

SetBookContext (used by the software implementing the organizing and consulting method according to the invention when the user inserts the PageLet into a book, in order to supply the PageLet with a reference to this book and to indicate to it its location in the book).

An Application Programming Interface (API) which can be used by the developers of PageLets is supplied in the context of a PageLet development kit. It allows them to have access to the various methods exhibited by the C++ objects which represent the book. This interface provides the following functionalities, in particular:

access to the structure of the book (chapters, pages, annotations);

access to the contents referenced by the pages of the book (direct access to the binary content or API for access to the text);

access to the other books of the library (depending on the level of certification of the PageLet).

As far as the implementation of the PageLets in the form of Web pages is concerned, the software implementing the organizing and consulting method according to the invention furnishes an easy-to-use interface allowing other ISVs and potentials users to produce their own PageLets as simple Web documents.

Figure 2:
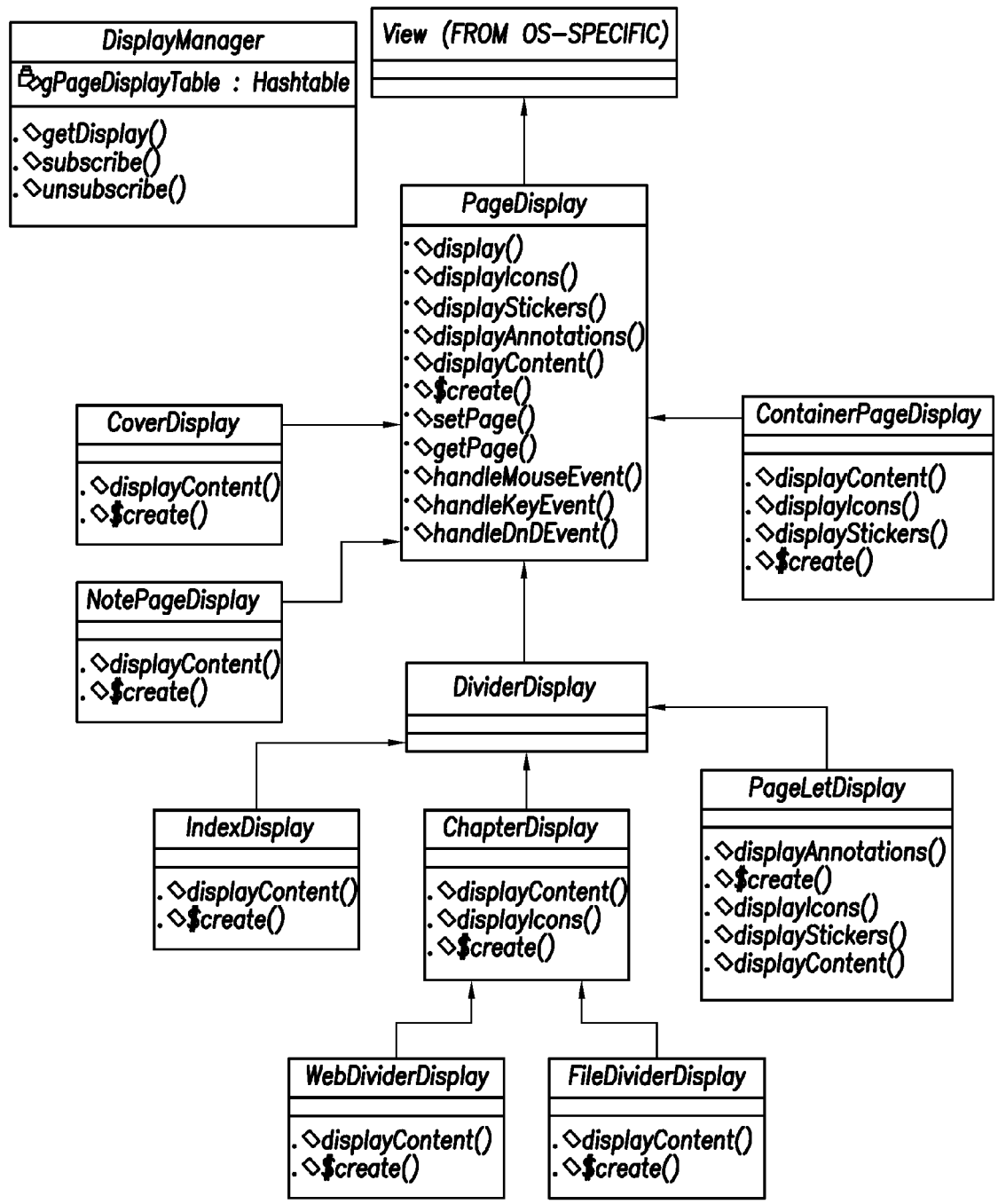
FIG. 2 illustrates an example of the implementation of PageLets within the organizing and consulting method according to the invention.

The PageLets used in the method according to the invention may also be implemented in the way represented in FIG. 2.

The organization and consultation method according to the invention exhibits interfaces allowing the PageLets to be registered in the current library, to have access to the database of the library and to use the automation (script) mechanisms of the software implementing the organizing and consulting method according to the invention. The solution which we have adopted for exhibiting these interfaces will allow third parties to use them transparently from the C++ environments (Visual C++ as well as the RAD rapid development environments such as that from Borland), the 4GLs supporting VBA (typically Visual Basic) and the PageLets written in JScript and VBScript.

The interface used in the software implementing the organization and consultation method according to the invention can be described in the form of a dual dispinterface in the IDL language. The 4GLs (VB, Borland C++ Builder) will use the IDispatch interface (in particular its Invoke method), while the 3GLs (Visual C++) will use the standard interfaces based on vtable via their C++ proxies generated automatically by MIDL.

The organization and consultation method according to the invention furnishes an implementation of the IDocHostUIHandler to the WebBrowser2 component (also called IE4/MSHTML) which it will integrate, using the ICustomDoc interface exhibited by this component. This IDocHostUIHandler interface will serve for several things. However, for calling PageLets, the implementation of the IDocHostUIHandler:: GetExternal will return the dual IDispatch interface described above.

The PageLets could then have access to these interfaces, using an extremely simple script syntax: window.external [.BooXeven properties and methods].

Figure 1:
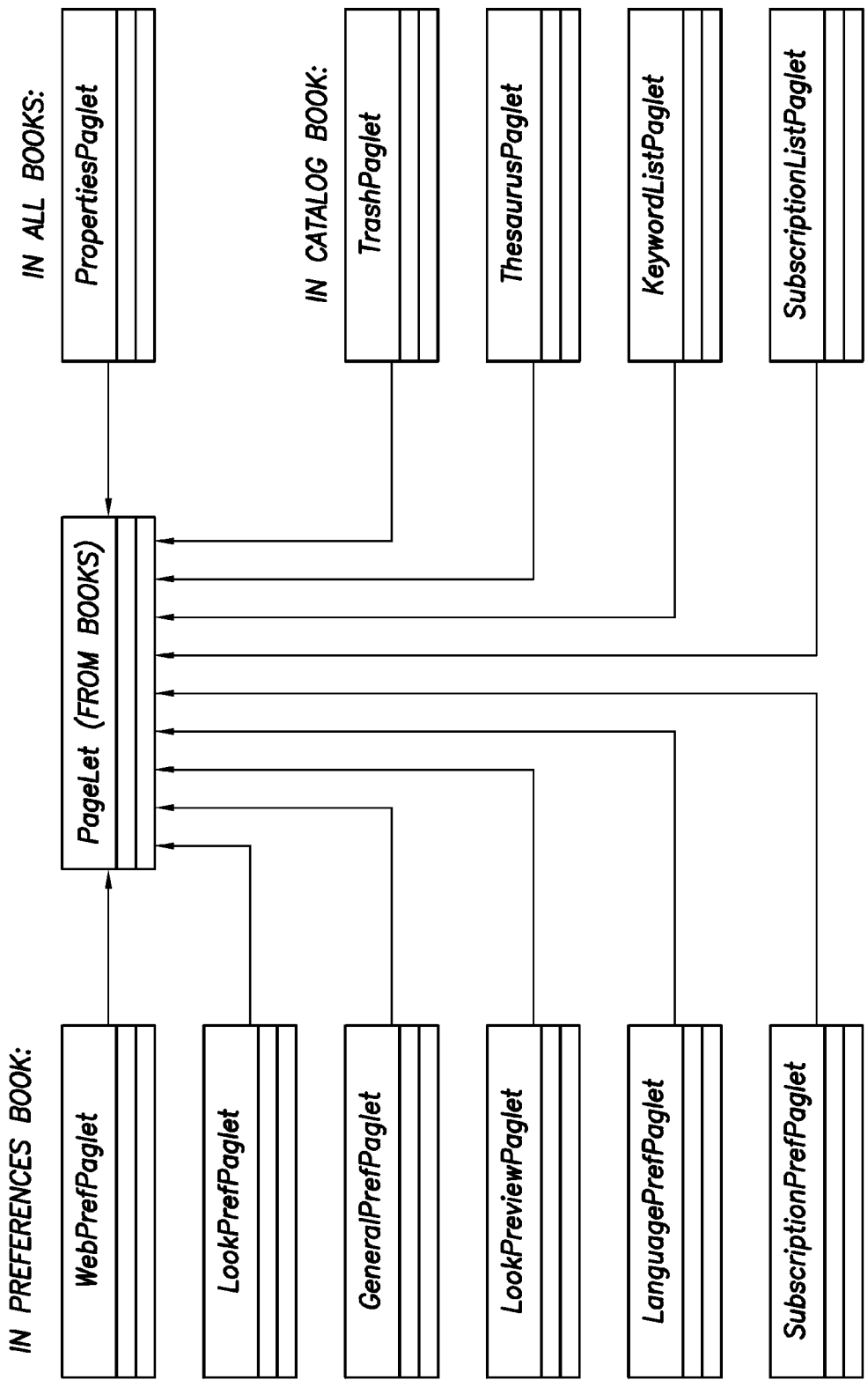
FIG. 1 describes an object model of the books which is employed in the organizing and consulting method according to the invention.
Figure 3:
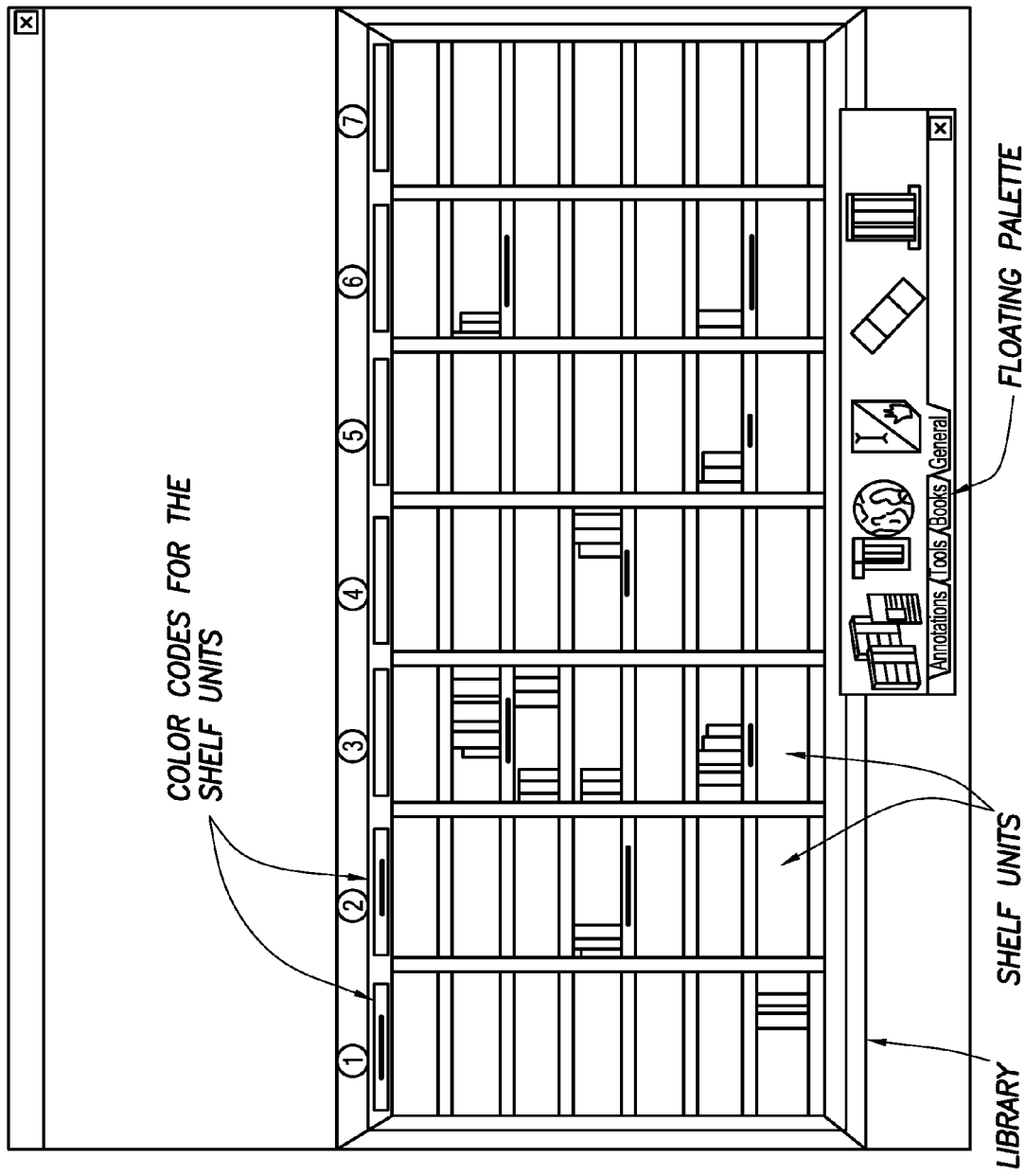
FIG. 3 illustrates a model for visually displaying pages which is employed in the organizing and consulting method according to the invention.

It should be noted that, in the organization and consultation method according to the invention, an object model of the books can be employed, such as that represented in FIG. 1, and a model of visual displays of the pages such as that represented in FIG. 3.

The invention is certainly not limited to the examples which have just been described, and numerous enhancements may be made to these examples without departing from the scope of the invention.

The invention claimed is:

1. A method for creating an electronic book, comprising:
obtaining a first plurality of electronic documents, wherein each of the first plurality of electronic documents is obtained from one of a plurality of sources;
presenting the first plurality of electronic documents using a book metaphor, wherein the first plurality of electronic documents is organized within the book metaphor in a first order and wherein the first order defines a location of each of the first plurality of electronic documents within the book metaphor,
wherein the book metaphor enforces sequential navigation through the first plurality of electronic documents defined by the first order, and wherein the book metaphor enables a user to select one of the plurality of electronic documents from which to begin the sequential navigation;
obtaining a first additional electronic document, wherein the first additional electronic document comprises a computer program configured to, when executed, modify the first order of the first plurality of electronic documents to obtain a second order;
executing the computer program, wherein executing of the computer program results in modifying the order for the plurality of electronic documents such that the plurality of electronic documents are arranged in the second order, wherein the second order defines a location of each of the first plurality of electronic documents within the book metaphor; and
logging usage information for the user of at least one of the first plurality of electronic documents, wherein the usage information comprises action type, action description, a userID corresponding to the user, and a time stamp denoting the time of an action of the action type was performed,
wherein the book metaphor enforces sequential navigation through the first plurality of electronic documents in an order defined by the second order after execution of the computer program,
wherein the relative location of at least one of the first plurality of documents in the first order is different than the relative location of the at least one of the first plurality of documents in the second order.

2. The method of claim 1, further comprising:
adding the first additional electronic document into the second order within the book metaphor.

3. The method of claim 1, further comprising:
obtaining a second additional electronic document, wherein the second additional electronic document comprises a computer program configured to, when executed, obtain usage information, within the book metaphor, of the first plurality of electronic documents, wherein the usage information specifies a duration of time at least one user viewed of the first plurality of electronic documents; and
adding the second additional electronic document into the second order within the book metaphor.

4. The method of claim 1, further comprising:
obtaining a second additional electronic document, wherein the second additional electronic document comprises a computer program configured to, when executed, provide search functionality to enable a user to search for content located in at least one of the first plurality of electronic documents; and
adding the second additional electronic document into the second order within the book metaphor.

5. The method of claim 1, further comprising:
obtaining a second additional electronic document, wherein the second additional electronic document comprises a computer program configured to, when executed:
generate a summary of content located in at least one of the first plurality of electronic documents,
create a summary electronic document comprising the summary,
determine a location within the second order in which to insert the summary electronic document, and
insert the summary electronic document into the second order using the location.

6. The method of claim 5, further comprising:
adding the second additional electronic document into the second order within the book metaphor.

7. The method of claim 1, further comprising:
obtaining a second additional electronic document, wherein the second additional electronic document comprises a computer program configured to, when executed:
generate an index of content located in the first plurality of electronic documents,
create an index electronic document comprising the index,
obtain a location within the second order in which to insert the index electronic document, and
insert the index electronic document into the second order using the location.

8. The method of claim 7, further comprising:
adding the second additional electronic document into the second order within the book metaphor.

9. The method of claim 1, wherein the location of each of the first plurality of documents defined in the second order is one selected from a group consisting of a chapter in the book metaphor and a sub-chapter in the book metaphor.

10. The method of claim 1, further comprising:
obtaining a second additional electronic document, wherein the second additional electronic document comprises a computer program configured to, when executed:
enforce selective access to at least one of the first plurality of electronic documents.

11. The method of claim 1, wherein obtaining the first additional electronic document comprising:
selecting the first additional electronic document from a second plurality of electronic documents, wherein each of the second plurality of electronic documents comprises a computer program,
wherein the second plurality of electronic documents are presented using a catalogue metaphor, and
wherein the catalogue metaphor comprises, for at least one of the second plurality of electronic documents, a description of the computer program and a preview of functionality provided by the computer program.

12. The method of claim 11, wherein each of the second plurality of electronic documents is presented as a page in the catalogue metaphor.

13. The method of claim 11, wherein each of the computer programs within the second plurality of electronic documents comprises a common architecture.

14. The method of claim 11, wherein the book metaphor and the catalogue metaphor are presented using a library shelf metaphor.

15. The method of claim 1, wherein obtaining the first additional electronic document comprises downloading the first additional electronic document from a third-party website.

16. The method of claim 1, wherein the first order is based on a URL address associated with each of the first plurality of electronic documents.

17. The method of claim 1, wherein the first order is based on a chronological order in which each of the first plurality of electronic documents was obtained from the plurality of sources, wherein each of the plurality of sources is accessible over a network.

18. The method of claim 1, further comprising:
obtaining a second additional electronic document, wherein the second additional electronic document comprises a computer program configured to, when executed, generate a table of contents; and
adding the second additional electronic document into the second order within the book metaphor,
wherein an entry in the table of contents corresponds to a local copy of one of the first plurality of electronic documents,
wherein the entry comprises an indicator that indicates whether the local copy is different than a remote copy of the one of the first plurality of electronic documents located at the corresponding one of the plurality of sources.

* * * * *

UNITED STATES PATENT AND TRADEMARK OFFICE
CERTIFICATE OF CORRECTION

| | | |
|---|---|---|
| PATENT NO. | : 7,574,649 B1 | Page 1 of 1 |
| APPLICATION NO. | : 09/132327 | |
| DATED | : August 11, 2009 | |
| INVENTOR(S) | : Michel Safars et al. | |

It is certified that error appears in the above-identified patent and that said Letters Patent is hereby corrected as shown below:

On the Cover Page:

On the Cover Page of the patent under section (56), References Cited, U.S. Patent Documents, --5,924,108 filed 06/13/1999-- is erroneously missing.

On the Cover Page of the patent under section (56), References Cited, U.S. Patent Documents, --5,870,737 filed 02/29/1999-- is erroneously missing.

Signed and Sealed this

Twenty-seventh Day of October, 2009

David J. Kappos
*Director of the United States Patent and Trademark Office*